(12) United States Patent
Shah et al.

(10) Patent No.: US 12,068,976 B2
(45) Date of Patent: Aug. 20, 2024

(54) METHODS AND SYSTEMS FOR AGGREGATING AND EXCHANGING MESSAGES IN AN IoT COMMUNICATION SYSTEM

(71) Applicant: Samsung Electronics Co., Ltd., Suwon-si (KR)

(72) Inventors: Sapan Pramodkumar Shah, Bangalore (IN); Basavaraj Jayawant Pattan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/445,268

(22) Filed: Aug. 17, 2021

(65) Prior Publication Data
US 2022/0052963 A1    Feb. 17, 2022

(30) Foreign Application Priority Data

Aug. 17, 2020   (IN) .............................. 202041035448
Aug. 11, 2021   (IN) .............................. 202041035448

(51) Int. Cl.
*H04L 67/61*   (2022.01)
*H04L 47/6295*   (2022.01)
(Continued)

(52) U.S. Cl.
CPC ........ *H04L 47/828* (2013.01); *H04L 47/6295* (2013.01); *H04L 47/821* (2013.01);
(Continued)

(58) Field of Classification Search
CPC ... G16Y 40/35; H04L 47/6295; H04L 47/821; H04L 47/828; H04L 67/1044; H04L 67/12; H04L 67/566; H04L 67/61; H04L 69/28
See application file for complete search history.

(56) References Cited

U.S. PATENT DOCUMENTS 10,122,600 B1 *   11/2018   Hutz ....................... H04L 67/12
2002/0004820 A1 *   1/2002   Baldwin ................. H04L 51/23
709/206

(Continued)

FOREIGN PATENT DOCUMENTS

EP   2991300 A1   3/2016
KR   20100064462 A   6/2010

OTHER PUBLICATIONS

International Search Report and Written Opinion of the International Searching Authority in connection with International Application No. PCT/KR2021/010906 issued Nov. 19, 2021, 7 pages.

(Continued)

*Primary Examiner* — Jason D Recek

(57) ABSTRACT

The present disclosure relates to a pre-5th generation (5G) or 5G communication system to be provided for supporting higher data rates beyond 4th generation (4G) communication system such as long term evolution (LTE). A method disclosed herein includes sending message requests, identifying at least one of a size of each of the messages associated with the message requests or a priority of each of the messages associated with the message requests, determining to aggregate the message requests, when at least one of the size of each of the messages associated with the message requests is less than a threshold segment size or the priority of each of the messages associated with the message requests is one of the low priority or the medium priority, aggregating the message requests into a single message request, and sending the single message request.

16 Claims, 30 Drawing Sheets

(51) Int. Cl.
  *H04L 47/70* (2022.01)
  *H04L 51/58* (2022.01)
  *H04L 67/104* (2022.01)
  *G16Y 40/35* (2020.01)

(52) U.S. Cl.
  CPC .......... *H04L 51/58* (2022.05); *H04L 67/1044* (2013.01); *H04L 67/61* (2022.05); *G16Y 40/35* (2020.01)

(56) References Cited

U.S. PATENT DOCUMENTS

| | | |
|---|---|---|
| 2009/0129321 A1 | 5/2009 | Jain |
| 2010/0289643 A1 | 11/2010 | Trundle et al. |
| 2012/0005727 A1* | 1/2012 | Lee ................ H04L 9/3271 726/3 |
| 2012/0044887 A1* | 2/2012 | Zdarsky ............ H04L 67/02 370/329 |
| 2018/0097710 A1 | 4/2018 | Nochta |
| 2019/0239048 A1 | 8/2019 | Nuttall et al. |
| 2019/0260464 A1 | 8/2019 | Roy et al. |
| 2019/0289439 A1* | 9/2019 | Sangameshwara ... H04W 28/04 |

OTHER PUBLICATIONS

Supplementary Partial European Search Report dated Jan. 5, 2024, in connection with European Patent Application No. 21858562.8, 12 pages.

Supplementary European Search Report dated Mar. 22, 2024, in connection with European Patent Application No. 21858562.8, 17 pages.

Dong Wei et al: "Dynamic Packet Length Control in Wireless Sensor Networks," IEEE Transactions on Wireless Communications, vol. 13, No. 3, Mar. 2014, 10 pages.

3GPP TR 23.700-24 V0.7.0 (Aug. 2020); Technical Report; 3rd Generation Partnership Project; Technical Specification Group Services and System Aspects; Study on support of the 5GMSG Service; (Release 17); 60 pages.

* cited by examiner

FIG. 6B

| Information element | Status | Description |
|---|---|---|
| Individual Message ID | M | Unique identifier of this individual message |
| Disposition Type | O | Indicates the disposition type expected from the receiver (i.e., delivered or read or both) |
| Application ID | O | Identifies the application for which the payload is intended |
| Payload | M | Payload of the message |
| Priority Type | O | Application priority level requested for this message |

FIG. 6C

| Information element | Status | Description |
|---|---|---|
| Originator MSGin5G Client ID | M | The identity of the MSGim5G Client sending the message |
| Group ID | M | The identifier of the MSGin5G group |
| Message ID | M | Unique identifier of this message |
| Number of individual messages | M | Indicates total number of messages which are aggregated into single message |
| List of Individual Group Message data | M | Each element in this list contains information |

FIG. 7B

| Information element | Status | Description |
|---|---|---|
| Originator MSGin5G Client ID | M | The identity of the MSGin5G Client who initiated the message |
| Individual Message ID | M | Unique identifier of the Group message being aggregated |
| Disposition Type | O | Indicates the disposition type expected from the receiver (i.e., delivered or read or both) as specified in Group Message Request received from originating MSGin5G client |
| Application ID | O | Identifies the application for which the payload is intended as specified in Grop Message Request received from originating MSGin5G client |
| Payload | M | Payload of the message |
| Priority Type | O | Application priority level requested for this message as specified in Grop Message Request received from originating MSGin5G client |

FIG. 7C

| Information element | Status | Description |
|---|---|---|
| Group ID | M | The identifier of the MSGin5G group to which the message is sent |
| Recipient ID | M | The identity of the MSGin5G Client of the receiver UE |
| Message ID | M | Unique identifier of this message |
| Number of individual messages | M | Indicates total number of messages which are aggregated into single message |
| List of Individual Group Message data | M | Each element in this list contains information |

FIG. 8B

| Information element | Status | Description |
|---|---|---|
| Originator MSGin5G Client ID | M | The identity of the MSGin5G Client sending the message |
| Individual Message ID | M | Unique identifier of the message being aggregated |
| Disposition Type | O | Indicates the disposition type expected from the receiver (i.e., delivered or read or both) |
| Application ID | O | Identifies the application for which the payload is intended |
| Payload | M | Payload of the message |
| Priority Type | O | Application priority level requested for this message |

FIG. 8C

| Information element | Status | Description |
|---|---|---|
| Group ID | M | The identifier of the MSGin5G group |
| Message ID | M | Unique identifier of this message |
| Number of individual messages | M | Indicates total number of messages which are aggregated into single message |
| List of Individual Group Message data | M | Each element in this list contains information |

FIG. 9B

| Information element | Status | Description |
|---|---|---|
| Individual Message ID | M | Unique identifier of this individual message |
| Application ID | O | Identifies the application for which the payload is intended |
| Disposition Type | O | Indicates the disposition type expected from the receiver (i.e., delivered or read or both) |
| Payload | M | Payload of the message |
| Priority Type | O | Application priority level requested for this message |

FIG. 9C

| Information element | Status | Description |
|---|---|---|
| Originator MSGin5G Client ID | M | The identity of the MSGin5G Client sending the message |
| Destination MSGin5G Client ID | M | The identity of the target MSGin5G Client for the message delivery |
| Message ID | M | Unique identifier of this message |
| Number of individual messages | M | Indicates total number of messages which are aggregated into single message |
| List of Individual Message data | M | Each element in this list contains information |

FIG. 9D

| Information element | Status | Description |
|---|---|---|
| Originator MSGin5G Client ID | M | The identity of the MSGin5G Client sending the message |
| Destination MSGin5G Client ID | M | The identity of the target MSGin5G Client for the message delivery |
| Message ID | M | Unique identifier of this message |
| Reject Reason | O | This IE contains the failure reason, e.g. the originatior is not authorized to send a message request or one of the multiple messages aggregated has an issue, may be included in this IE |

FIG. 11B

| Information element | Status | Description |
|---|---|---|
| Individual Message ID | M | Unique identifier of this individual message |
| Application ID | O | Identifies the application for which the payload is intended |
| Disposition Type | O | Indicates the disposition type expected from the receiver (i.e., delivered or read or both) |
| Payload | M | Payload of the message |
| Priority Type | O | Application priority level requested for this message |

FIG. 11C

| Information element | Status | Description |
|---|---|---|
| Originator MSGin5G Client ID | M | The identity of the MSGin5G Client sending the message |
| Destination AS service ID | M | The identity of the target application server for the message delivery |
| Message ID | M | Unique identifier of this message |
| Number of individual messages | M | Indicates total number of messages which are aggregated into single message |
| List of Individual Message data | M | Each element in this list contains information |

FIG. 11D

| Information element | Status | Description |
|---|---|---|
| Originator MSGin5G Client ID | M | The identity of the MSGin5G Client sending the message |
| Destination MSGin5G Client ID | M | The identity of the target MSGin5G Client for the message delivery |
| Message ID | M | Unique identifier of this message |
| Reject Reason | O | This IE contains the failure reason, e.g. the originatior is not authorized to send a message request or one of the multiple messages aggregated has an issue, may be included in this IE |

FIG. 12B

| Information element | Status | Description |
|---|---|---|
| Originator MSGin5G Client ID | M | The identity of the MSGin5G Client who initiated the message |
| Individual Message ID | M | Unique identifier of the Group message being aggregated |
| Disposition Type | O | Indicates the disposition type expected from the receiver (i.e., delivered or read or both) as specified in Group Message Request received from originating MSGin5G client |
| Application ID | O | Identifies the application for which the payload is intended as specified in Grop Message Request received from originating MSGin5G client |
| Payload | M | Payload of the message |
| Priority Type | O | Application priority level requested for this message as specified in Grop Message Request received from originating MSGin5G client |

FIG. 12C

| Information element | Status | Description |
|---|---|---|
| Recipient ID | M | The identity of the MSGin5G Client of the receiver UE |
| Message ID | M | Unique identifier of this message |
| Number of individual messages | M | Indicates total number of messages which are aggregated into single message |
| List of Individual Group Message data | M | Each element in this list contains information |

FIG. 13B

| Information element | Status | Description |
|---|---|---|
| Individual Message ID | M | Unique identifier of this individual message |
| Application ID | O | Identifies the application for which the payload is intended |
| Disposition Type | O | Indicates the disposition type expected from the receiver (i.e., delivered report) |
| Payload | M | Payload of the message |
| Priority Type | O | Application priority level requested for this message |

FIG. 13C

| Information element | Status | Description |
|---|---|---|
| Originator MSGin5G Service ID | M | The service identity of the sending message Client |
| Recipient MSGin5G Service ID | M | The service identity of the receiving MSGin5G message Client |
| Message ID | M | Unique identifier of this message |
| Number of individual messages | M | Indicates total number of messages which are aggregated into single message |
| List of Individual Message data | M | Each element in this list contains information |

FIG. 13D

| Information element | Status | Description |
|---|---|---|
| Destination MSGin5G Client ID | M | The identity of the MSGin5G Client sending the original message |
| Message ID | M | Unique identifier of this message |
| Reject Reason | O | This IE contains the failure reason, e.g. the originatior is not authorized to send a message request or one of the multiple messages aggregated has an issue, may be included in this IE |

METHODS AND SYSTEMS FOR AGGREGATING AND EXCHANGING MESSAGES IN AN IoT COMMUNICATION SYSTEM

CROSS-REFERENCE TO RELATED APPLICATIONS

This application is based on and claims priority under 35 U.S.C. § 119(a) of the Indian Provisional patent application number 202041035448, filed on Aug. 17, 2020, in the Indian Patent Office, and the Indian Non-Provisional patent application number 202041035448, filed on Aug. 11, 2021, in the Indian Patent Office, the disclosures of which are incorporated by reference herein in their entirety.

BACKGROUND

1. Field

The present disclosure relates to the field of an Internet of Things (IoT) communication and more particularly to aggregating and exchanging messages in an IoT communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A message service, a MSGin5G service has been defined by a 3rd Generation Partnership Project (3GPP) in a 5G system, which enables various message communication models with advanced messaging service capabilities and performance over the 5G system. The MSGin5G service supports message communication models such as, a point-to-point message, an application-to-point message, a group message, and a broadcast message.

Further, the MSGin5G service is basically designed and optimized for message communications between massive Internet of Things (MIoT) devices, which include a thing-to-thing communication and a person-to-thing communication. A typical IoT device communication sends and receives small data, which may be delivered in a message. However, characteristics of the MIoT devices such as, but are not limited to, high density connection, flexible mobility, saving power limited computing capability, bulk of devices, traffic pattern of short burst of small data, and so on, bring various new demands on the message communications. Examples of the new demands may be, but are not limited to, requirements of lightweight message communication for provision and monitoring, ultra-low latency and high reliability message communication for remote control, extremely high resource efficiency for large-scale connections, and so on.

According to one of requirements, considering the MIoT devices and a high throughput of the message communications between the MIoT devices or between the MIoT devices and application servers, the MSGin5G service has to be in a resource efficient manner to optimize the resource usage of both a control plane and a user plane. The MIoT devices may have limitation in computation and storage and may use batteries or a small solar photovoltaic equipment, so that the message communications have to be lightweight and well scheduled in order to save power and data traffic consumption in the MIoT devices.

Further, it may be possible that the MIoT devices may send data which is significantly smaller than a maximum segment size allowed to transmit over an available transport. However, in such a scenario, control plane and user plane resources may not be utilized to its full capacity, if a higher number of messages exchanged between the MIoT devices are for sending and receiving the data, which is significantly smaller than the maximum segment size. In addition, exchanging the higher number of messages between the MIoT devices for sending and receiving the data, which is significantly smaller than the maximum segment size may result in lots of overheads.

Further, it may be possible that the higher number of messages may be exchanged between the MIoT devices and the application servers for the data, which is significantly smaller than the maximum segment size. In such a scenario, the control plane and user plane resources may not be utilized to its full capacity.

The principal object of the embodiments herein is to disclose methods and systems for aggregating and exchanging messages in an Internet of Things (IoT) communication system.

Another object of the embodiments herein is to disclose methods and systems for aggregating a plurality of message requests into a single message request and transmitting the single message request to at least one target device, wherein a size of each message of each message request is less than a threshold segment size and a priority of each message is one of, a low priority or a medium priority.

SUMMARY

Accordingly, the embodiments herein provide methods and systems for exchanging messages in an Internet of Things (IoT) communication. A method includes initiating, by a first device, a message request for transmitting a message to a second device. The method includes checking, by the first device, at least one of, a size or a priority of the message associated with the message request. The method includes determining, by the first device to aggregate the message request, if at least one of the size of the associated message is less than a threshold segment size or the priority of the associated message is one of a low priority or a medium priority. The method includes aggregating, by the first device, a plurality of message requests into a single message request, wherein each message request of the plurality of message requests is the message request determined to aggregate. The method includes sending, by the first device, the single message request to the second device.

The method further includes receiving, by the second device, the single message request including the aggregated plurality of message requests. The method includes splitting, by the second device, the single message request into at least one individual message request.

Accordingly, embodiments herein provide an Internet of Things (IoT) communication system comprising a first device and a second device. The first device is configured to initiate a message request for transmitting a message to a second device. The first device is configured to check at least one of, a size or a priority of the message associated with the message request. The first device is configured to determine to aggregate the message request, if at least one of the size of the associated message is less than a threshold segment size or the priority of the associated message is one of a low priority or a medium priority. The first device is configured to a plurality of message requests into a single message request, wherein each message request of the plurality of message requests is the message request determined to aggregate. The first device is configured to send the single message request to the second device.

The second device is configured to receive the single message request including the aggregated plurality of message requests. The second device is configured to split the single message request into at least one individual message request.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which:

FIG. 6B is an example table depicting information elements (IEs) of an individual group message request initiated at the UE, according to embodiments as disclosed herein;

FIG. 6C is an example table depicting IEs of a single group message request transmitted from the UE towards the group of target devices, according to embodiments as disclosed herein;

FIG. 7B is an example table depicting IEs of an individual group message request initiated at the application server, according to embodiments as disclosed herein;

FIG. 7C is an example table depicting IEs of a single group message request aggregated at the message server for the target UE, according to embodiments as disclosed herein;

FIG. 8B is an example table depicting IEs of an individual group message request initiated at the originator UE, according to embodiments as disclosed herein;

FIG. 8C is an example table depicting IEs of a single group message request aggregated at the message server for the same application server, according to embodiments as disclosed herein;

FIG. 9B is an example table depicting IEs of an individual point-to-point message request initiated at the originator UE, according to embodiments as disclosed herein;

FIG. 9C is an example table depicting IEs of a single point-to-point message request aggregated at the originator UE for the target UE, according to embodiments as disclosed herein;

FIG. 9D is an example table depicting IEs of a reject message received by the originator UE in response to the transmitted single point-to-point message request, according to embodiments as disclosed herein;

FIG. 11B is an example table depicting IEs of an individual point-to-application message request initiated at the originator UE, according to embodiments as disclosed herein;

FIG. 11C is an example table depicting IEs of a single point-to-application message request aggregated at the originator UE for the application server, according to embodiments as disclosed herein;

FIG. 11D is an example table depicting IEs of a reject message received by the originator UE in response to the transmitted single point-to-application message, according to embodiments as disclosed herein;

FIG. 12B is an example table depicting IEs of an individual application-to-point message request initiated at the application server, according to embodiments as disclosed herein;

FIG. 12C is an example table depicting IEs of a single application-to-point message request aggregated at the message server for the target UE, according to embodiments as disclosed herein;

FIG. 13B is an example table depicting IEs of an individual point-to-point message request initiated at the originator UE, according to embodiments as disclosed herein;

FIG. 13C is an example table depicting IEs of a single point-to-point message request aggregated at the originator UE for the target UE, according to embodiments as disclosed herein; and FIG. 13D is an example table depicting IEs of a reject message received by the originator UE in response to the transmitted single point-to-point message request, according to embodiments as disclosed herein.

DETAILED DESCRIPTION

Figure 1:
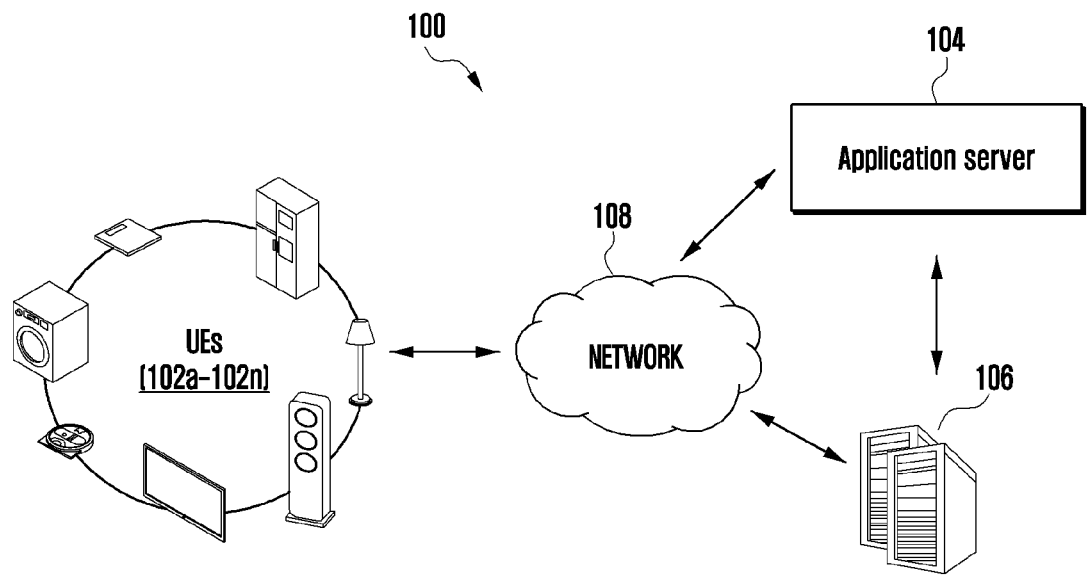
FIG. 1 depicts an Internet of Things (IoT) communication system, according to embodiments as disclosed herein.

FIGS. 1 through 13D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for aggregating multiple message requests associated with small data and less priority into a single message request. Embodiments herein aggregate the multiple message requests into the single message request by addressing various aspects. Examples of the aspects may be, but are not limited to:

(1) how to make message communication resource efficient to optimize the resource usage of both a control plane and a user plane?

(2) what scheduling policy has to be followed in order to make sure that an application server is not overloaded with messages at particular time?

(3) how can a messaging service support to distribute the scheduling policy to application client? and/or (4) how to efficiently use resources for sending and receiving of typical small data?

Referring now to the drawings, and more particularly to FIGS. 1 through 13D, where similar reference characters denote corresponding features consistently throughout the figures, there are shown example embodiments.

Embodiments herein use the terms such as "first device," "originator UE," "message server," "source device," "transmitting device," and so on, interchangeably to a device which aggregates messages and transmits the aggregated messages to a target device.

Embodiments herein use the terms such as "second device," "target UE," "target device," "receiving device," and so on, interchangeably to refer to a device that receives the aggregated messages from the first device.

Embodiments herein use the terms such as "message requests," "messages," and so on, interchangeably through the document.

FIG. 1 depicts an Internet of Things (IoT) communication system 100, according to embodiments as disclosed herein. The IoT communication system/massive IoT (MIoT) communication system 100 referred herein may be configured to enable IoT/MIoT devices to exchange messages between each other for sending or receiving data between each other. In an example herein, the data may include at least one of, media (such as, an audio, a video, an image, a graphics interchange format (GIF), or the like), text, webpages, and so on.

The IoT communication system 100 includes a plurality of user equipments (UEs) 102a-102n, a plurality of application servers (AS) 104, and a message server 106.

The plurality of UEs 102a-102n, the plurality of application servers 104, and the message server 106 may be connected with each other. In an example, the plurality of UEs 102a-102n, the plurality of application servers 104, and the message server 106 may be connected with each other using a communication network 108. The communication network 108 may include at least one of, but is not limited to, a wired network, a value-added network, a wireless network, a satellite network, or a combination thereof. Examples of the wired network may be, but are not limited to, a Local Area Network (LAN), a Wide Area Network (WAN), an Ethernet, and so on. Examples of the wireless network may be, but are not limited to, a cellular network, a wireless LAN (Wi-Fi), Bluetooth, Bluetooth low energy, Zigbee, Wi-Fi Direct (WFD), Ultra-wideband (UWB), infrared data association (IrDA), near field communication (NFC), and so on. Examples of the cellular network may be, but are not limited to, a Third Generation Partnership 3rd Generation Partnership Project (3GPP) Long Term Evolution (LTE/4G), an LTE-Advanced (LTE-A), a Fifth Generation (5G) New Radio, a 6G wireless system, an Evolved-UTRA (E-UTRA), or any other next generation network. In another example, the plurality of UEs 102a-102n, the plurality of application servers 104, and the message server 106 may be connected with each other directly (for example: via a direct communication, via an access point, and so on). In another example, the plurality of UEs 102a-102n may be connected to the message server 106 and the plurality of UEs 102a-102n may be connected to the one or more application servers 104 through the message server 106. In another example, the plurality of UEs 102a-102n, the plurality of application servers 104, and the message server 106 may be connected with each other via a relay, a hub, and a gateway. It is understood that the plurality of UEs 102a-102n, the plurality of application servers 104, and the message server 106 may be connected with each other in any of various manners (including those described above) and may be connected to each other in two or more of various manners (including those described above) at the same time.

The plurality of UEs 102a-102n may be IoT devices or MIoT devices capable of exchanging information with each other and other devices (such as, the one or more application servers 104, the message server 106, or the like). Examples of the UE (102a-102n) may be, but are not limited to, a smart phone, a mobile phone, a video phone, a computer, a tablet personal computer (PC), a netbook computer, a laptop, a wearable device, a vehicle infotainment system, a workstation, a server, a personal digital assistant (PDA), a smart plug, a portable multimedia player (PMP), an MP3 layer, a mobile medical device, a light, a voice assistant device, a camera, a home appliance, one or more sensors, and so on. Examples of the home appliance may be, but are not limited to, a television (TV), a digital video disk (DVD) player, an audio device, a refrigerator, an air conditioner (AC), an air purifier, a chimney, a cooktop, a vacuum cleaner, an oven, microwave, a washing machine, a dryer, a set-top box, a home automation control panel, a security control panel, a game console, an electronic key, a camcorder, an electronic picture frame, a coffee maker, a toaster oven, a rice cooker, a pressure cooker, and so on. Examples of the sensors may be, but are not limited to, a temperature sensor, a humidity sensor, an infrared sensor, a gyroscope sensor, an atmospheric sensor, a proximity sensor, an RGB sensor (a luminance sensor), a photosensor, a thermostat, an Ultraviolet (UV) light sensor, a dust sensor, a fire detection sensor, a carbon dioxide ($CO_2$) sensor, a smoke sensor, a window contact sensor, a water sensor, a Electromyography (EMG) sensor, a heart rate sensor, O2 level monitor sensor, a glucometer, a door lock sensor, a light controller, an air controller, or any other equivalent sensor. A function of each sensor may be intuitively inferred by one of ordinary skill in the art based on its name, and thus, its detailed description is omitted.

The one or more UEs 102a-102n may be connected with the same application server 104 or the different application servers 104. In an example, the UEs (102a-102n) such as, an EMG sensor, a heart rate sensor, a O2 level monitor sensor, a glucometer, or the like, may be associated with a first application server 104, wherein the first application server is a health application server. In other example, the UEs (102a-102n) such as, a light controller, an air controller, a door lock sensor, or the like, may be associated with a second application server 104, wherein the second application server is a smart home application server 104.

The UEs 102a-102n may include one or more applications. Examples of the applications may be, but are not limited to, a video streaming application, an audio application, a sensor related application, a device control-based application, and so on.

The application server(s) 104 referred herein may be a server configured to obtain, store, and manage device information, capabilities, and location information of each of the one or more UEs 102a-102n present in an IoT environment. Examples of the IoT environment may be, but are not limited to, a smart home environment, a smart office environment, a smart hospital environment, and so on. The device information may include information such as, but are not limited to, an identification value (for example: device ID information) of each of the one or more UEs 102, a device type of each of the one or more UEs 102, and so on. In an example herein, the identification value/device ID information may include information such as, but are not limited to, a media access control (MAC) identifier (MAC ID), a serial number, a unique device ID, and so on.

The message server 106 may be configured to control multiple terminals such as, but are not limited to, the plurality of UEs 102a-102n, the one or more application servers 104, or the like.

Embodiments herein enable one of the UEs (102a-102n) and/or the message server 106 to manage transmission of messages intended for at least one target device over an available transport protocol. In an embodiment, the UE (102*a*-102*n*), which sends/transmits the messages to the target device may be referred hereinafter as an originator UE and the UE (102*a*-102*n*), which receives the messages may be referred hereinafter as a target UE. In an embodiment, the target device may be the target UE (102*a*-102*n*). In another embodiment, the target device may be the application server 104. In another embodiment, the target device may be a group of target UEs 102*a*-102*n*. In another embodiment, the target device may be a group of application servers 104. Examples of the transport protocol may be, but are not limited to, hyper text transfer protocol (HTTP), constrained application protocol (CoAP), session initiation protocol (SIP), and so on.

The originator UE (for example, a UE 102*a*)/the message server 106 initiates/receives a message request for transmitting a message to the target device (102*a*-102*n*)/104 (for example, at least one of, the one or more UEs (102*b*-102*n*) and the one or more application servers 104). In an example, the originator UE 102*a* may initiate the message request, when the one or more applications on the originator UE 102*a* want to transmit the one or more messages to the target device (102*b*-102*n*)/104. In another example, the message server 106 may receive the message request from the one or more originator UEs (102*a*-102*n*). In another example, the message server 106 may receive the message request from the one or more application servers 104.

In an embodiment, the message may include at least one of, a group message, a point-to-point message/individual message, a point-to-application message, an application-to-point message, a delivery report, and so on. In an example, the message may include the group message from originator UE (102*a*-102*n*) targeted towards the group of target UEs (102*a*-102*n*). In another example, the message may include the group message from the plurality of different originator UEs 102*a*-102*n* towards the group of target UEs (102*a*-102*n*). In another example, the message may include the group message from the originator UE 102*a* targeted towards the group of target UEs (102*b*-102*n*)/application servers 104. In another example, the message may include the group message from the plurality of different originator UEs (102*a*-102*n*) targeted towards the group of application servers 104. In another example, the message may include the message from the plurality of application servers 104 towards the target UE (102*a*-102*n*). In another example, the message may include the point-to-point message from the originator UE 102*a* targeted towards the target UE 102*b*. In another example, the message may include the point-to-application message from the originator UE 102*a* targeted towards the application server 104. In another example, the message may include the application-to-point message from the application server 104 targeted towards the target UE (102*a*-102*n*).

In an embodiment, the message request associated with the message may include at least one of, a group message request, a point-to-point/individual message request, a point-to-application message request, an application-to-point message request, a delivery report request, and so on.

In an embodiment, the message request may include one or more fields/information elements (IEs) such as, but are not limited to, a unique message identifier (ID), an application ID, a disposition type, a payload, a priority, and so on. The unique message ID identifies the message. The application ID identifies the application for which the payload is intended on the target device (102*b*-102*n*)/104. The disposition type indicates a disposition type expected from the target device (102*b*-102*n*)/104. Examples of the disposition type may be, but are not limited to, "delivery report requested," "read report requested," and so on. The payload identifies the actual message. The priority of the message indicates one of, a low priority, a medium priority, and a high priority.

On initiating/receiving the message request, the originator UE 102*a*/the message server 106 checks at least one of, but is not limited to, a size of the message, the priority of the message, and so on. The originator UE 102*a*/the message server 106 checks the size of the message (including headers and the payload) using the IEs of the associated message request and the priority of the message using the priority IE of the associated message request. The originator UE 102*a*/the message server 106 compares the size of the message with a threshold segment size. The threshold segment size is a maximum size that is allowed for the message request/message to transmit to the target device (102*b*-102*n*)/104 over the available transport protocol. In an example, the threshold size may be defined/set based on a type of the available transport protocol, but it may be obvious to a person skilled in the art that any other similar constraints may be considered to define/set the threshold segment size.

If the size of the message is lesser than the threshold segment size and/or the priority of the message is the low priority or the medium priority, the originator UE 102*a*/the message server 106 determines to aggregate the message request associated with the corresponding message.

The originator UE 102*a*/the message server 106 initiates a process of aggregating a plurality of message requests into a single message request based on a scheduling policy. In accordance with the scheduling policy, the originator UE 102*a*/the message server 106 determines a time period to wait for receiving subsequent message requests to aggregate before sending the single message request to the target device (102*b*-102*n*)/104. In an example, the time period may be determined based on time periods specified (for example, by an operator) while implementing the system 100. On determining the time period, the originator UE 102*a*/the message server 106 initiates a timer with a timer value of the determined time period. On initiating the timer, the originator UE 102*a*/the message server 106 recursively initiates/receives subsequent message requests and determines to aggregate each subsequent message request based on the size and/or priority of the message associated with each subsequent message request, until an expiry of the timer or until the size of a total number of message requests determined to aggregate is less than or almost equal to the threshold segment size.

On the expiry of the timer or if the size of the total number of message requests determined to aggregate is less than or almost equal to the threshold segment size, the originator UE 102*a*/the message server 106 aggregates the plurality of message requests determined to aggregate into the single message request. The originator UE 102*a*/the message server 106 aggregates the plurality of message requests into the single message request by including at least one of, but is not limited to, an identity (ID) of a messaging client module 304 in the originator UE 102*a*, an ID of the messaging client module 304 in the target device (102*b*-102*n*)/104, a message ID of the single message request to the target device, the total number of message requests determined to be aggregated in the single message request, a list of individual messages that are aggregated, or the like, in the single message request. The size of the single message request is lesser than or equal to the threshold segment size.

The originator UE 102*a*/the message server 106 transmits the single message request to the target device (102*b*-102*n*)/

104. The originator UE 102a may transmit the single aggregated message request to the target device (102b-102n)/104 through the message server 106. The message server 106 transmits the single aggregated message request to the target device (102b-102n)/104 by following procedures defined in the 3GPP specification 23.700-24, wherein instead of the individual message request, the single message request including the aggregated plurality of message requests has been transmitted.

Consider an example scenario, wherein the originator UE 102a initiates a first message request including the message of a size 600 bytes and the priority of the message is low. In such a scenario, the originator UE 102a compares the size of the message with the threshold segment size (for example, 1200 bytes). As the size of the message of the first message request is lesser than the threshold segment size and the priority of the message is low, the originator UE 102a determines to aggregate the first message request. The originator UE 102a then initiates a process of aggregating the message requests based on the scheduling policy. In accordance with the scheduling policy, the originator UE 102a initiates the timer. The originator UE 102a initiates a second message request (for example, including the message with the size of 200 bytes and the low priority) and a third message request (for example, including the message with the size of 400 bytes and the medium priority). The originator UE 102a determines that the size of the first, second and third message requests/messages in total is equal to the threshold segment size. In such a scenario, the originator UE 102a terminates the timer and aggregates the first message request, the second message request and the third message request in the single message request. The originator UE 102a transmits the single message request to the target device (102a-102n) through the message server 106.

Consider another example scenario, wherein the originator UE 102a initiates a first message request and the originator UE 102a determines to aggregate the first message request. The originator UE 102a then initiates a process of aggregating the message requests based on the scheduling policy. In accordance with the scheduling policy, the originator UE 102a initiates the timer. The originator UE 102a initiates second, third, fourth message requests and determines that the size of the first, second, third, and fourth message requests in total is greater than the threshold segment size. In such a scenario, the originator UE 102a terminates the timer and aggregates the first message request, the second message request and the third message request in the single message request. The originator UE 102a transmits the single message request to the target device (102a-102n) through the message server 106.

Consider an example scenario, wherein the originator UE 102a initiates a first message request and the originator UE 102a determines to aggregate the first message request. The originator UE 102a then initiates a process of aggregating the message requests based on the scheduling policy. In accordance with the scheduling policy, the originator UE 102a initiates the timer. The originator UE 102a initiates and determines to aggregate second, third, fourth message requests, till the expiry of the timer. The size of the first, second, third, and fourth message requests in total is lesser than the threshold segment size. In such a scenario, the originator UE 102a aggregates the first, second, third and fourth message requests in the single message request. The originator UE 102a transmits the single message request to the target device (102a-102n) through the message server 106.

Embodiments herein enable the target device (102b-102n)/104 to manage reception of the single message request including the aggregated plurality of message requests.

The target device (102b-102n)/104 receives the single message request including the aggregated plurality of message requests from the originator UE 102a/the message server 106. The target device (102b-102n)/104 splits the single message request into one or more individual message requests.

Embodiments herein enable the message server 106 to manage exchange of the messages between the originator UE 102a and the target device (102b-102n)/104.

The message server 106 receives the single message request from the originator UE 102a, which has been intended for the target device (102b-102n)/104. The single message request includes the aggregated plurality of message requests. Each message request may be associated with at least one of, but is not limited to, the point-to-point message, the group message, or the like. On receiving the single message request from the originator UE 102a, the message server 106 validates the originator UE 102a to check if the originator UE 102a is authenticated and authorized to transmit the single message request to the target device (102b-102n)/104. The message server 106 may validate the originator UE 102a based on one or more policies. In an example, the policy may indicate a limit on certain types of messages or content to certain target device (102b-102n)/104 due to at least one of, the associated location, user privilege, or the like. In another example, the policy may indicate that whether the originator UE 102a is registered or not for transmitting the single message request. In another example, the policy may indicate that whether the originator UE 102a is configured or authorized by the application server 104 for transmitting the single message request or not.

If the originator UE 102a is authorized and authenticated to transmit the single message request, the message server 106 resolves the group ID (i.e., the ID of the messaging client module 304 in the target device) present in the single message request to determine the target device (102b-102n)/104 for which the single message request has to be transmitted and determines a registration status of the target device (102b-102n)/104 based on information/assistance received from a group management server (not shown). On resolving the group ID of the target device (102b-102n)/104 and determining the registration status, the message server 106 transmits the single message request received from the originator UE 102a to the target device (102b-102n)/104.

The message server 106 may also request the target device (102b-102n)/104 to transmit the delivery report for the received single message request. In such a scenario, the target device (102b-102n)/104 transmits the delivery report to the message server 106, on receiving the single message request of the originator UE 102a through the message server 106. The message server 106 forwards/communicates the delivery report received from the target device (102b-102n)/104 to the originator UE 102a.

Thus, exchanging the single message request including the aggregated plurality of message requests between the devices optimizes usage of control plane and user plane resources, which further saves power consumption.

FIG. 1 shows exemplary blocks of the IoT communication system 100, but it is to be understood that other embodiments are not limited thereon. In other embodiments, the IoT communication system 100 may include less or more number of blocks. Further, the labels or names of the blocks are used only for illustrative purpose and does not limit the scope of the embodiments herein. One or more blocks can be combined together to perform same or substantially similar function in the IoT communication system 100.

Figure 2:
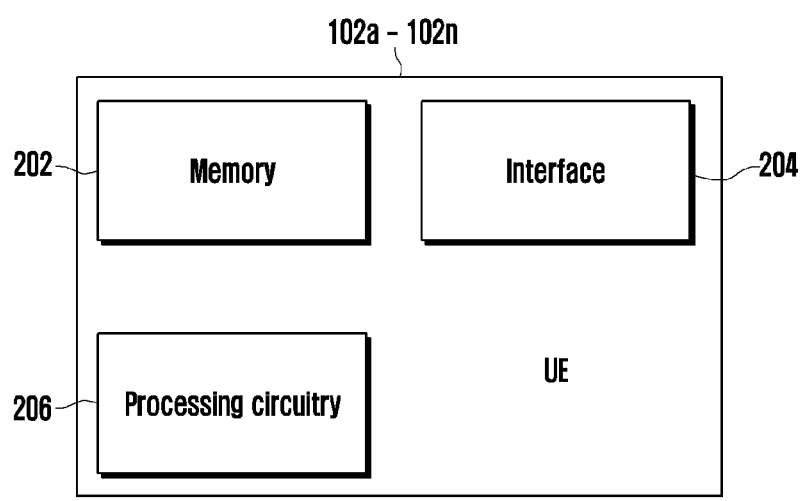
FIGS. 2 and 3 are example block diagrams depicting various components of a user equipment (UE) for aggregating a plurality of message requests into a single message request, according to embodiments as disclosed herein.

FIG. 2 is an example block diagram depicting various components of the UE (for example: the UE 102a) for aggregating the plurality of message requests into the single message request, according to embodiments as disclosed herein. The UE 102a includes a memory 202, an interface 204, and a processing circuitry 206. The UE 102a may also include at least one of, at least one antenna, at least one RF transceiver coupled with the processing circuitry 206, a transmission processing circuitry, a reception processing circuitry, a display, input/output (IO) ports, and so on (not shown).

The memory 202 stores at least one of, but is not limited to, the one or more applications, the one or more messages, the threshold segment size which is allowed for the message request to transport over the available transport protocol, the aggregated message requests, and so on. Examples of the memory 202 may be, but are not limited to, NAND, embedded multimedia card (eMMC), secure digital (SD) cards, universal serial bus (USB), serial advanced technology attachment (SATA), solid-state drive (SSD), and so on. The memory 202 may also include one or more computer-readable storage media. The memory 202 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 202 may, in some examples, be considered a non-transitory storage medium. The term "non-transitory" may indicate that the storage medium is not embodied in a carrier wave or a propagated signal. However, the term "non-transitory" should not be interpreted to mean that the memory 202 is non-movable. In some examples, the memory 202 can be configured to store larger amounts of information than the memory. In certain examples, a non-transitory storage medium may store data that can, over time, change (e.g., in random access memory (RAM) or cache).

The interface 204 may be configured to enable the UE 102a to communicate with the one or more application servers 104 and the message server 106 through an interface. Examples of the interface may be, but are not limited to, a wired or wireless fronthaul interface, a wired or wireless backhaul interface, or any other structure supporting communications over a wired or wireless connection.

The processing circuitry 206 includes at least one of, a single processer, a plurality of processors, multiple homogeneous or heterogeneous cores, multiple central processing units (CPUs) of different kinds, microcontrollers, special media, and other accelerators. The processing circuitry 206 may be configured to aggregate the plurality of message requests into the single message request and transmit the single message request to the target device (102b-102n)/104. The processing circuitry 206 may also be configured to receive the single message request from the message server 106 and splits the received single message request into the plurality of individual message requests.

Figure 3:
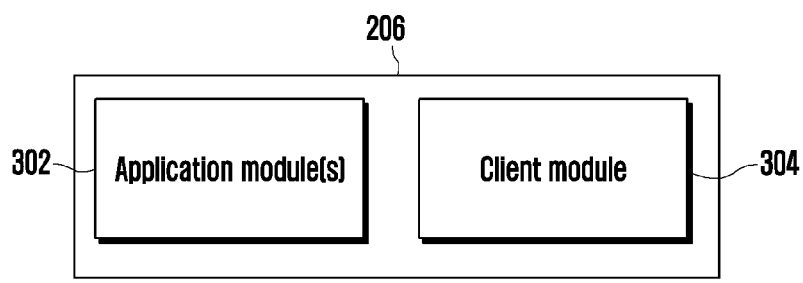

As depicted in FIG. 3, the processing circuitry 206 includes one or more application modules 302, and a client module/messaging client module 304.

The one or more application modules 302 may be associated with the one or more applications present in the UE 102a. The application module(s) 302 may be configured to initiate the message request for transmitting the message to the target device (102b-102n)/104. In an example, the application module 302 may initiate the message request, when the associated application wants to send the data to the target device (102b-102n)/104. In an example, the target device (102b-102n)/104 may include at least one of, the same group of target UEs (102b-102n), the target UE (for example: the UE 102b), the group of application servers 104, the specific application server 104, or the like. In an example, the message may include the group message targeted towards the same group of target UEs (102b-102n), In another example, the message may include the point-to-point message targeted towards the particular target UE 102b. In another example, the message may include the group message targeted towards the same group of application servers 104. In another example, the message may include the point-to-application message targeted towards the particular application server 104.

The client module 304 may be configured to aggregate the plurality of message requests into the single message request and transmit the single message request to the target device (102b-102n)/104. The client module 304 receives the message request initiated by the application module 302. The message request may be associated with the message intended for the target device (102b-102n)/104. The client module 304 checks the size of the message and/or the priority of the message. If the size of the message is lesser than the threshold segment size and/or the priority of the message is the low priority or the medium priority, the client module 304 determines to aggregate the associated message request.

The client module 304 may aggregate the message requests based on the scheduling policy. In accordance with the scheduling policy, the client module 304 determines the time period to wait for the reception of the subsequent message requests from the application module 302. On determining the time period, the client module 304 initiates the timer. The timer value of the timer may be the determined time period to wait for the reception of the subsequent message requests. On initiating the timer, the client module 304 recursively collects/receives the subsequent message requests from the one or more application modules 302 and determines to aggregate each of the subsequent message requests by checking the size and/or the priority of the message associated with each subsequent message request, till the expiry of the timer or the size of the total number of message requests determined to aggregate is less than or almost equal to the threshold segment size. On the expiry of the timer or the size of the total number of message requests determined to aggregate is less than or almost equal to the threshold segment size, the client module 304 aggregates the determined plurality of message requests to aggregate (including the message request initially received from the application module 302 and the subsequent message requests) into the single message request.

The client module 304 transmits the single message request to the message server 106, which in turn transmits the single message request to the target device (102b-102n)/104.

The client module 304 may also receive the reject message with the cause for reject from the message server 106, if the UE 102a is not authenticated and authorized to transmit the single message request to the target device (102b-102n)/104 or the single message request is not valid.

The client module 304 may also receive the delivery report from the target device (102b-102n)/104 through the message server 106, upon a successful delivery of the single message request to the target device (102b-102n)/104.

In an embodiment, the client module 304 may also be configured to manage the reception of the single message request, if the UE 102a is the target device (i.e., the UE 102a is intended for receiving the single message request from the other UEs (102b-102n)/the application server 104).

The client module 304 receives the single message request from the originator UE (102b-102n) or the application server 104 through the message server 106. The client module 304 splits/decodes the single message request into the individual message requests. The client module 304 splits the single message request into the individual message requests using the list of individual message IE present in the single message request and delimiters. The list of individual message IE represents the total number of individual message requests aggregated in the single message request. The delimiters may be used to indicate a start of the individual message requests. The client module 304 forwards the messages associated with the individual message requests to the one or more application modules 302 for further processing. In an example, the one or more application modules 302 may provide the received messages to the one or more applications.

The client module 304 may also be configured to receive the delivery report request from the message server 106 in the received single message request. In such a scenario, the client module 304 transmits the delivery report to the message server 106, on receiving the single message request of the originator UE (102a-102n) through the message server 106.

FIGS. 2 and 3 show exemplary blocks of the UE (102a-102n), but it is to be understood that other embodiments are not limited thereon. In other embodiments, the UE (102a-102n) may include less or more number of blocks. Further, the labels or names of the blocks are used only for illustrative purpose and does not limit the scope of the embodiments herein. One or more blocks can be combined together to perform same or substantially similar function in the UE (102a-102n).

Figure 4:
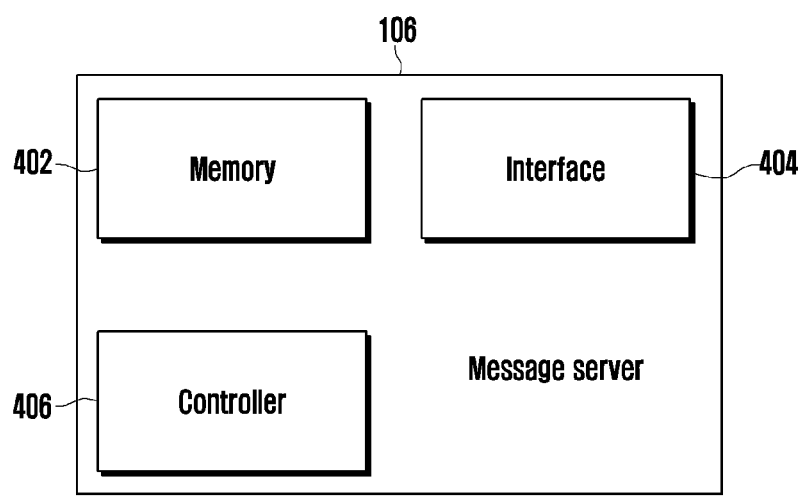
FIG. 4 is an example block diagram depicting various components of a message server for managing exchange of the messages in the IoT communication system by aggregating the plurality of message requests into the single message request, according to embodiments as disclosed herein.

FIG. 4 is an example block diagram depicting various components of the message server 106 for managing exchange of the messages in the IoT communication system 100 by aggregating the plurality of message requests into the single message request, according to embodiments as disclosed herein. The message server 106 referred herein may be a cloud computing device (can be a part of a public cloud or a private cloud), a standalone server, a server on a cloud, a database, a computing device, and so on. Examples of the computing device may be, but are not limited to, a personal computer, a notebook, a tablet, desktop computer, a laptop, a handheld device, a mobile device, and so on. Also, the message server 106 may be at least one of, a microcontroller, a processor, a system on chip (SoC), an integrated chip (IC), a microprocessor based programmable consumer electronic device, and so on. The message server 106 includes a memory 402, an interface 404, and a controller 406.

The memory 402 stores at least one of, but is not limited to, information about the UEs 102a-102n, and the application servers 104, the aggregated plurality of messages, the threshold segment size, the one or more policies to validate the originator UE (102a-102n), and so on. Examples of the memory 402 may be, but are not limited to, NAND, embedded multimedia card (eMMC), secure digital (SD) cards, universal serial bus (USB), serial advanced technology attachment (SATA), solid-state drive (SSD), and so on. The memory 402 may also include one or more computer-readable storage media. The memory 402 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 402 may, in some examples, be considered a non-transitory storage medium. The term "non-transitory" may indicate that the storage medium is not embodied in a carrier wave or a propagated signal. However, the term "non-transitory" should not be interpreted to mean that the memory 402 is non-movable. In some examples, the memory 402 can be configured to store larger amounts of information than the memory. In certain examples, a non-transitory storage medium may store data that can, over time, change (e.g., in random access memory (RAM) or cache).

The interface 404 may be configured to enable the message server 106 to communicate with the UEs 102a-102n, the one or more application servers 104, the group management server, or the like, through an interface. Examples of the interface may be, but are not limited to, a wired or wireless fronthaul interface, a wired or wireless backhaul interface, or any other structure supporting communications over a wired or wireless connection.

The controller 406 includes at least one of, a single processer, a plurality of processors, multiple homogeneous or heterogeneous cores, multiple central processing units (CPUs) of different kinds, microcontrollers, special media, and other accelerators.

In an embodiment, the controller 406 may be configured to aggregate the message requests received from the originator UE(s) 102a or the application server(s) 104 into the single message request and transmit the single message request to the target device (102b-102n)/104.

The controller 406 receives the message request for transmitting the message to the target device (102b-102n)/104. In an example, the controller 406 may receive the message request from the different originator UEs (102b-102n). In another example, the controller 406 may receive the message request from the one or more application servers 104. In an example, the target device (102b-102n)/104 includes the target UE (102b-102n) or the group of target UEs (102b-102n). In another example, the target device (102b-102n)/104 includes the application server 104 or the group of application servers 104. The message may include at least one of:

the group message from the originator UE (102a-102n) targeted towards the same group of target UEs (102a-102n);

the group message from the plurality of different originator UEs (102a-102n) targeted towards the same group of target UEs (102a-102n);

the group message from the plurality of different originator UEs (102a-102n) targeted towards the same group of application servers 104;

the message from the one or more application servers 104 targeted towards the same target UE (102a-102n);

the point-to-point message from the originator UE 102a targeted towards the target UE 102b;

the point-to-application message from the originator UE 102a targeted towards the application server 104;

the application-to-point message from the application server 104 targeted towards the target UE (102a-102bn); or the delivery report from the originator UE 102a towards the target device (102b-102n)/104.

The controller 406 checks the size of the message and/or the priority of the message associated with the received message request. If the size of the message is such that only one message can be sent within the threshold segment size that can be transmitted over available transport, the controller 406 transmits the message to the target device (102a-102n)/104. If the size of the message is lesser than the threshold segment size and/or the priority of the message is the low priority or the medium priority, the controller 406 determines to aggregate the message.

The controller 406 initiates the process of receiving the plurality of subsequent message requests from the originator UEs (102a-102n) or the application servers 104 and aggregating the plurality of subsequent message requests into the single message request based on the scheduling policy. The controller 406 aggregates the plurality of subsequent message requests into the single message request based on the scheduling policy, similar to the client module 304 of the UE 102a, and thus a repeated description thereof is omitted for conciseness.

On aggregating the message requests, the controller 406 transmits the single message request to the respective target device (102a-102n)/104 following the procedures defined in the 3GPP specification 23.700-24.

In another embodiment, the controller 406 may also be configured to receive the single message request from the originator UE 102a and transmit the received single message request to the respective target device (102b-102n)/104. The single message request may include the aggregated plurality of message requests, which have been associated with the point-to-point messages and the group messages. For transmitting the single message request to the target device (102b-102n)/104, the controller 406 checks if the originator UE 102a is authenticated and authorized to transmit the single message request to the target device (102b-102n)/104 based on the one or more policies. If the originator UE 102a is not authenticated and authorized to transmit the single message request to the target device (102b-102n)/104, the controller 406 transmits the reject message with the cause for rejection to the originator UE 102a. If the originator UE 102a is authenticated and authorized to transmit the single message request to the target device (102b-102n)/104, the controller 406 resolves the group ID of the target device (102b-102n) and transmits the single message request received from the originator UE 102a to the respective target device (102b-102n)/104.

In an embodiment, the controller 406 may also be configured to transmit the deliver report request to the target device (102b-102n)/104 for the delivery report in the single message request. In response to the delivery report request, the controller 406 receives the delivery report from the target device (102b-102n)/104, when the target device (102b-102n)/104 receives the single message request of the originator UE 102a. The controller 406 forwards the received delivery report to the originator UE 102a.

FIG. 4 shows exemplary blocks of the message server 106, but it is to be understood that other embodiments are not limited thereon. In other embodiments, the message server 106 may include less or more number of blocks. Further, the labels or names of the blocks are used only for illustrative purpose and does not limit the scope of the embodiments herein. One or more blocks can be combined together to perform same or substantially similar function in the message server 106.

Figure 5:
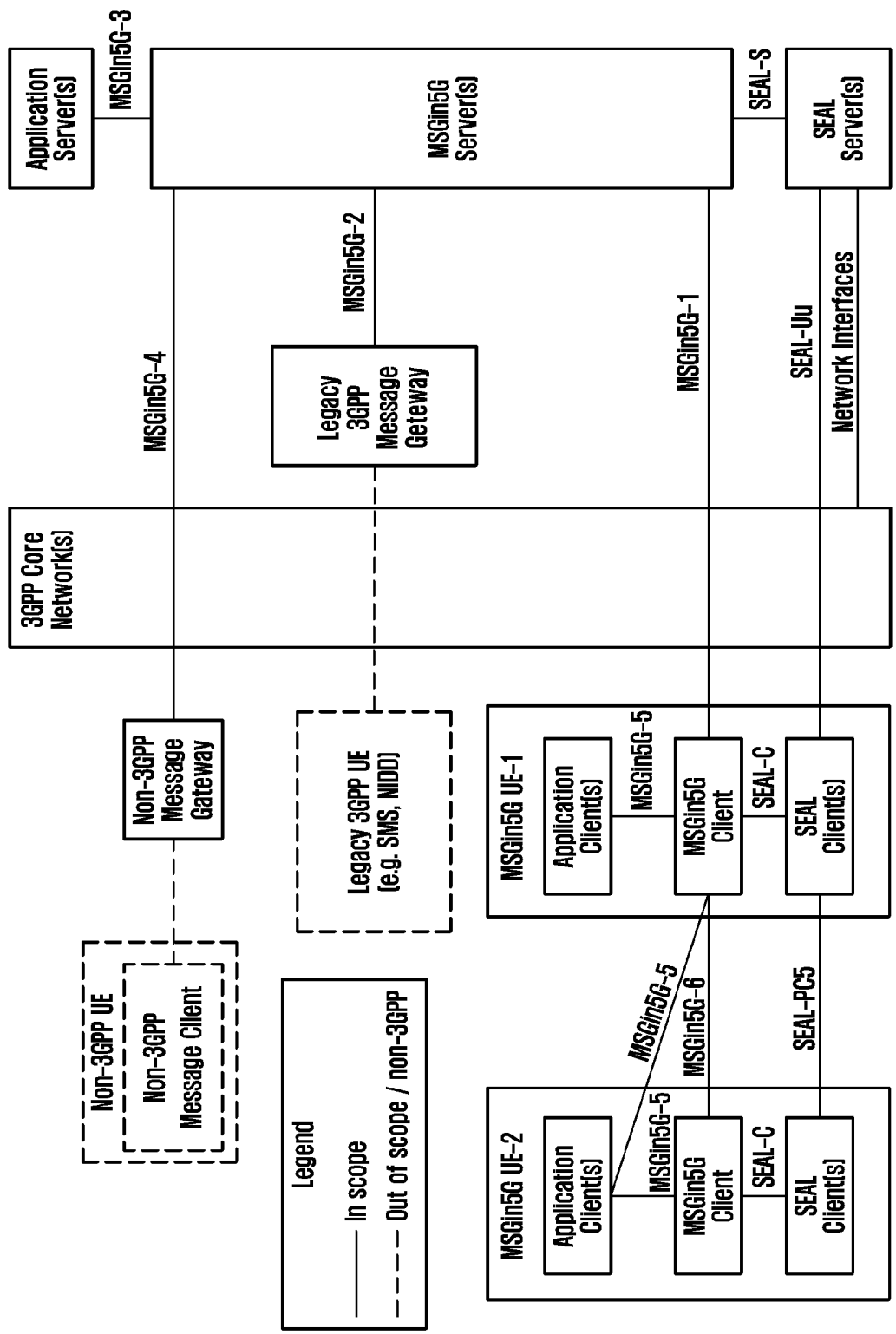
FIG. 5 is an example diagram depicting an example architecture for exchanging of the messages in the IoT communication system, wherein the IoT communication system is a 5G messaging system, according to embodiments disclosed herein.

FIG. 5 is an example diagram depicting exchanging of the messages in the IoT communication system 100, wherein the IoT communication system 100 is a 5G messaging system, according to embodiments disclosed herein.

Embodiments herein describe the exchanging of the messages in the 5G messaging system, as an example, but it may be obvious to a person skilled in the art that any other network system may be considered.

As depicted in FIG. 5, the 5G messaging system 100 includes the one or more UEs 102a-102n (for example: a legacy UE, a messaging in 5G (MSGin5G) UE, a non-3GPP UE, or the like), the application server 104, and the message server/MSGin5G server 106. The MSGin5G UE (102a-102n) includes the application module/application client(s) 302, and the client module/MSGin5G client 304.

In an embodiment, the MSGin5G client 304 of the MSGin5G UE (102a) may be configured to aggregate the plurality of message requests targeted to the same group of target UEs/application servers 104 into the single message request.

In an embodiment, the MSGin5G client 304 may be configured to aggregate the plurality of message requests targeted to the single UE (102a-102n) or the application server 104 into the single message request.

In an embodiment, the MSGin5G server 106 may be configured to aggregate the plurality of message requests targeted towards the application server 104 into the single message request.

In an embodiment, the MSGin5G server 106 may be configured to aggregate the plurality of message requests targeted to the single group of target device (102a-102n)/104 into the single message request.

In an embodiment, the MSGin5G server 106 may be configured to aggregate the plurality of message requests targeted to the single UE (102a-102n) into the single message request.

The message associated with each of the aggregated plurality of message requests (described above) is of size less than the threshold segment size (i.e., corresponding to small data) and of the low priority or the medium priority. The size or length of the single message request is less than or equal to the threshold segment size that is allowed for the message request to transmit over the available transport protocol.

Embodiments herein further explain exchanging of the messages in a 5G messaging system by considering as an example, but it may be obvious to a person skilled in the art that the IoT communication system supporting any other network may be considered. The UE (102a-102n) in the 5G messaging system includes the one or more application modules/application clients 302 associated with the one or more applications, and the client module/MSGin5G client 304. The MSGin5G client 304 registers with the message server/MSGin5G server 106.

Figure 6A:
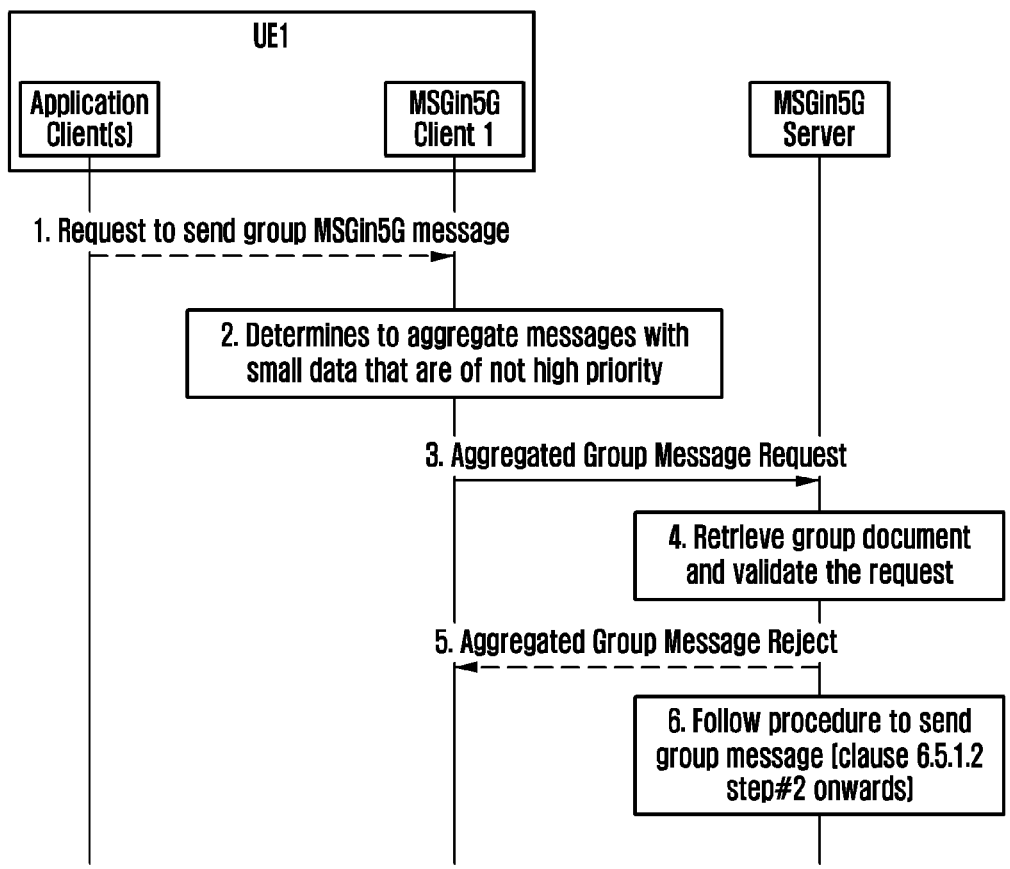
FIG. 6A is an example sequence diagram depicting aggregating group messages from one or more application clients in an originator UE and transmitting the aggregated group messages from the originator UE towards a group of target devices, according to embodiments as disclosed herein.

FIG. 6A is an example sequence diagram depicting aggregating the group messages from one or more application clients in the originator UE 102a and transmitting the aggregated group messages from the originator UE 102a towards the target device (102b-102n)/104, according to embodiments as disclosed herein.

At step 1, the application client(s) 302 on the UE 102a/UE 1 (the originator UE 102a) initiates the first message request(s) for the MSGin5G client 1 for transmitting the message to the target device(s) (102b-102n)/104. In an example herein, the target device may include the group of UEs (102b-102n)/the group of application servers 104. In an example herein, the first message request may be a first group message request associated with the group message.

At step 2, the MSGin5G client 1 determines if the initiated first group message request can be aggregated. For determining if the first message request can be aggregated, the MSGin5G client 1 checks the size and/or the priority of the group message associated with the first group message request. The MSGin5G client 1 checks the size and/or the priority of the group message using the IEs of the first message request. The IEs of the individual group message request is depicted in an example table of FIG. 6B. If the size of the group message is less than the threshold segment size and the priority of the message is the low priority or the medium priority, the MSGin5G client 1 determines to aggregate the message request.

On determining the message request to aggregate, the MSGin5G client 1 initiates a process of aggregating the plurality of group message requests into the single message request/single group message request based on the scheduling policy. In accordance with the scheduling policy, the MSGin5G client 1 determines the time period to wait for the reception of the subsequent message requests from the application clients 302. On determining the time period, the MSGin5G client 1 initiates the timer with the timer value of the determined time period to wait for the reception of the subsequent message requests. On initiating the timer, the steps 1 and 2 may be performed recursively till the expiry of the timer or until optimal use of segment size is reached (i.e., the size of the total number of messages determined to aggregate is less than or almost equal to the threshold segment size). The steps 1 and 2 may be performed to initiate the subsequent group message requests by the one or more application clients and determine whether each subsequent group message can be aggregated or not, On the expiry of the timer or the optimal use of segment size is reached, the MSGin5G client 1 aggregates the plurality of group message requests (for example, including the first group message request and the subsequent group message requests) determined to aggregate into the single group message request. The IEs of the single group message request is depicted in an example table of FIG. 6C. The size/length of the single group message request is less than or equal to the threshold segment size, which has been allowed for the single group message request to transmit.

At step 3, the MSGin5G client 1 sends the single group message request including the aggregated plurality of group message requests to the message server/MSGin5G server 106.

At step 4, the MSGin5G server 106 validates the MSGin5G client 1 to check if the MSGin5G client 1 of the UE 1 is authenticated and authorized to transmit the single group message request to the group of target UEs (102b-102n). The MSGin5G server 106 validates the MSGin5G client 1 based on the one or more policies such as, but are not limited to, the limit on certain types of messages or content to certain UEs due to the location or the user privilege, or the like. If the MSGin5G client 1 is authenticated and authorized to transmit the single group message request, the MSGin5G server resolves the group ID/MSGin5G group ID present in the single group message request (as depicted in the example table of FIG. 6C) to determine the target device (102b-102n)/104 and determines the registration status of the target device (102b-102n), based on the information from the group management server. If the MSGin5G client 1 is authenticated and authorized to transmit the single group message request, the MSGin5G server 106 skips a step 5.

If the MSGin5G client 1 is not authenticated and authorized to transmit the single group message request or the single group message request is not valid, the MSGin5G server 106 performs the step 5. At step 5, the MSGin5G server 106 transmits the reject message/aggregated group message reject message to the MSGin5G client 1 with the cause for rejection. IEs defined in the 3GPP TR 23.700-24 have been included in the reject message.

Figure 10:
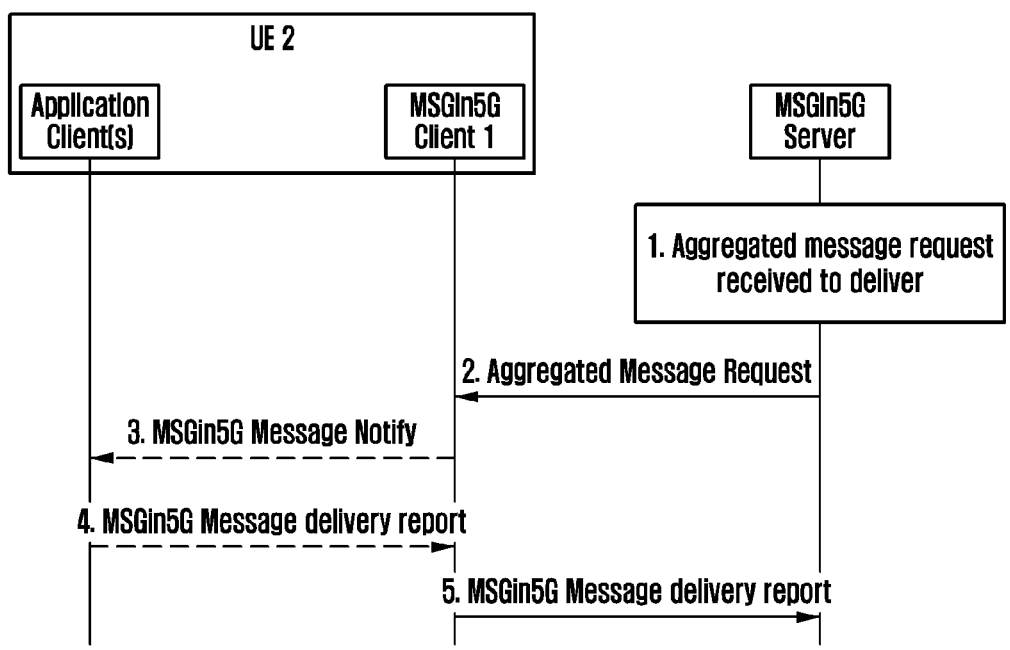
FIG. 10 is an example sequence diagram depicting delivery of a single aggregated point-to-point message request from the originator UE to the target UE, according to embodiments as disclosed herein.

If the MSGin5G client 1 is authenticated and authorized to transmit the single group message request, at step 6, the MSGin5G server 106 transmits the single group message request (as specified in the step 2) to the target device (102a-102n)/104 following the procedure defined in the FIG. 10, where instead of the individual message request, the single group message request including the plurality of aggregated group message requests have been transmitted.

Consider an example scenario, wherein an AC controller an example of the UE 1, includes three application clients associated with three applications and the three application clients 302 may be coupled with the MSGin5G client 1. In such a scenario, the three application clients initiate the group message requests simultaneously or one by one to transmit the group messages intended for the same group of target devices (for example, a group 1), wherein the group 1 includes the group of target UEs (102b-102n) being used by family members (present in the same group). The group messages may indicate at least one of, a current temperature, a mode of the AC, a notification to change the mode of the AC, and so on. In an example herein, consider that each group message may be of size less than the threshold segment size and of the low priority. In such a scenario, the MSGin5G client 1 aggregates the group message requests into the single group message request based on the scheduling policy. The MSGin5G server 106 transmits the single group message request to the target UEs of the group 1 simultaneously. Thus, efficiently utilizing the control plane and user plane resources.

Figure 7A:
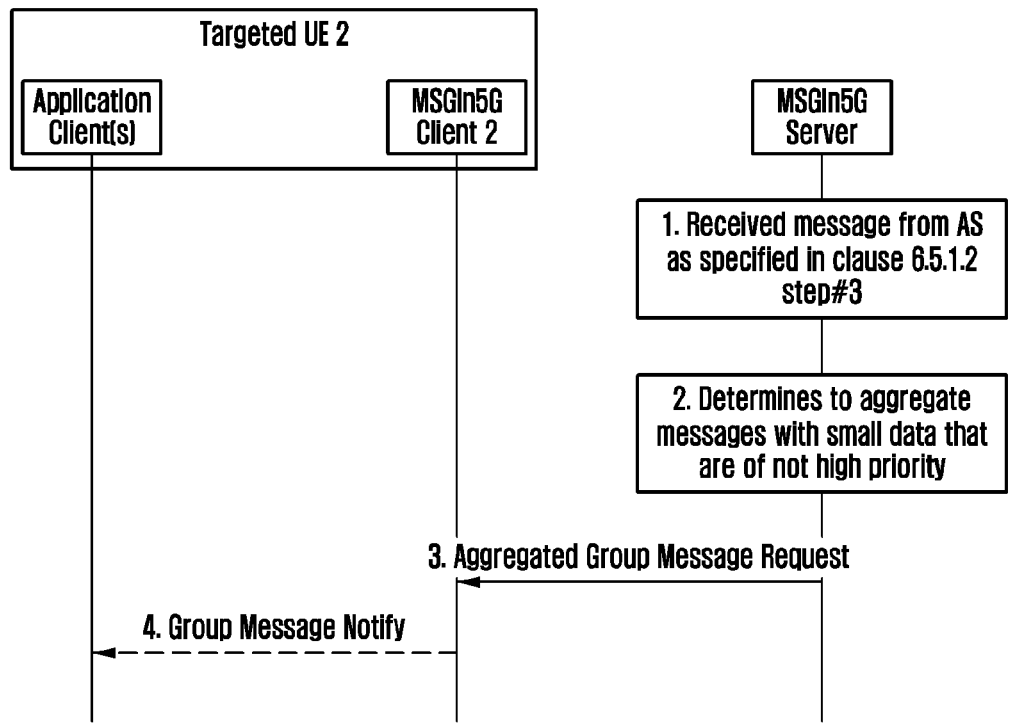
FIG. 7A is an example sequence diagram depicting aggregating group messages from one or more application servers and transmitting the aggregated group messages towards a target UE, according to embodiments as disclosed herein.

FIG. 7A is an example sequence diagram depicting aggregating the group messages from one or more application servers and transmitting the aggregated group messages towards the target UE (102a-102n), according to embodiments as disclosed herein.

At step 1, the MSGin5G server 106 receives the first message request(s) from the application server 104 intended for the target device. In an example herein, as depicted in FIG. 7A, the message request includes the group message request associated with the group message and the target device includes the UE 2/UE 102b (for example). The UE 2 includes the one or more application clients 302 and the client module 304/MSGin5G client 2.

At step 2, the MSGin5G server 106 determines if the initiated first group message request can be aggregated. For determining if the first group message request can be aggregated, the MSGin5G server 106 checks the size and/or the priority of the group message associated with the first group message request. The MSGin5G server 106 checks the size and/or the priority of the group message using the IEs of the first group message request. The IEs of the individual group message request initiated by the application server 104 is depicted in an example table of FIG. 7B. If the size of the group message is less than the threshold segment size and the priority of the group message is the low priority or the medium priority, the MSGin5G server 106 determines to aggregate the first group message request. Further, the steps 1 and 2 can be performed multiple times in order to receive the plurality of subsequent group message requests from the one or more application servers 104 and determine if each of the plurality of subsequent group message requests can be aggregated. The steps 1 and 2 can be performed multiple times, until the expiry of the timer or until the optimal use of segment size is reached. On the expiry of the timer or the optimal use of segment size is reached, the MSGin5G server 106 aggregates the plurality of group message requests (for example, including the first group message request and the subsequent group message requests) determined to aggregate into the single group message request. The IEs of the single group message request is depicted in an example table of FIG. 7C. The size/length of the single group message request is less than or equal to the threshold segment size, which has been allowed for the single group message request to transmit.

At step 3, the MSGin5G server 106 transmits the single group message request including the aggregated plurality of group message requests to the UE 2.

At step 4, the 5GSMS client 2 of the UE 2 splits the received single group message request into the multiple individual group message requests per application and forwards the multiple individual group message requests to the application clients 302.

Consider an example scenario, wherein a home appliance server and a health application server (an example of the application servers 104) is associated with the UE 2. The home application server may be coupled with at least one of, light controllers, an AC controller, door lock sensors, or the like. The health application server may be coupled with at least one of, an EMG sensor, a glucometer, or the like. The home application server and the health application server transmit the plurality of group message requests to the MSGin5G server 106 simultaneously or one by one, which have been intended for the same UE 2. The group message requests transmitted by the home appliance server may include the group message indicating status/operation of devices present in a home. The group message requests transmitted by the health application server may include the group messages indicating health notifications. In an example herein, consider that the group message associated with each group message request is of size lesser than the threshold segment size and of the medium priority. In such a scenario, the MSGin5G server 106 aggregates the plurality of group message requests received from the home appliance server and the health application server into the single message request based on the scheduling policy. The MSGin5G server 106 transmits the single message request to the UE 2. The 5GSMS client 2 of the UE 2 splits the received single group message request into the multiple individual group message requests for further processing.

Figure 8A:
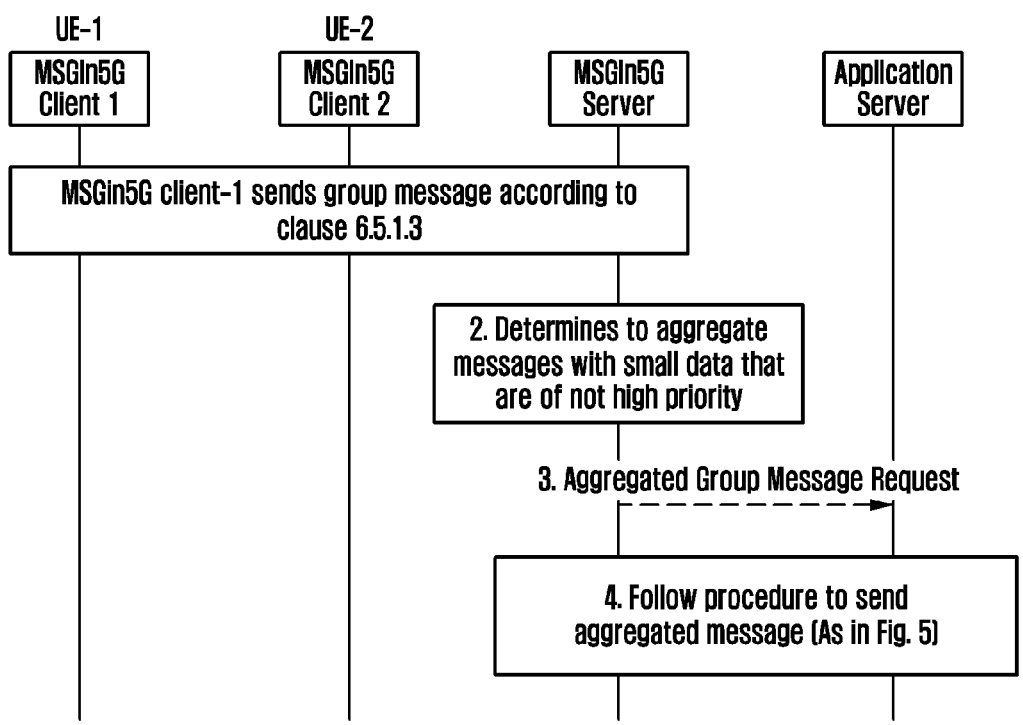
FIG. 8A is an example sequence diagram depicting aggregating group messages from one or more originator UEs and transmitting the aggregated group message towards the same application server, according to embodiments as disclosed herein.

FIG. 8A is an example sequence diagram depicting aggregating the group messages from one or more originator UEs (102a-102n) and transmission transmitting the aggregated group message requests towards the same application server 104, according to embodiments as disclosed herein.

At step 1, the MSGin5G server 106 receives a first message request from a first UE 102a/UE 1 (the originator UE 102a) to transmit a message for the target device. In an example herein, as depicted in FIG. 8A, the message request may be the group message request including the group message and the target device includes the application server 104.

At step 2, the MSGin5G server 106 determines if the first group message request can be aggregated. For determining if the first group message request can be aggregated, the MSGin5G server 106 checks the size and/or the priority of the group message associated with the first group message request. The MSGin5G server 106 checks the size and/or the priority of the message using the IEs of the first group message request. The IEs of the individual group message request received from the UE (102a-102n) is depicted in an example table of FIG. 8B. If the size of the group message is less than the threshold segment size and the priority of the group message is the low priority or the medium priority, the MSGin5G server 106 determines that the associated first message request can be aggregated. Further, the steps 1 and 2 can be performed multiple times in order to receive the plurality of subsequent group message requests from the UE 1 and the UE 2 and determine if each of the plurality of group message requests can be aggregated. The steps 1 and 2 can be performed multiple times, till the expiry of the timer or until the optimal use of segment size is reached. On the expiry of the timer or the optimal use of segment size is reached, the MSGin5G server 106 aggregates the plurality of group message requests (for example, including the first group message request received from the UE 1 and the subsequent group message requests received from the UE 1 and the UE 2) determined to aggregate into the single group message request. The IEs of the single group message request is depicted in an example table of FIG. 8C. The size/length of the single group message request is less than or equal to the threshold segment size, which has been allowed for the single group message request to transmit.

At step 3, the MSGin5G server 106 resolves the group ID/MSGin5G group ID present in the single group message request (as depicted in the example table of FIG. 8C) to determine the application server 104 for which the single message request has to be transmitted.

At step 4, the MSGin5G server 106 transmits the single group message request to the application server 104 following the procedure defined in the 3GPP TR 23.700-24, where instead of the individual group message request, the single group message request including the plurality of aggregated group message requests has been transmitted.

Consider an example scenario, wherein a light controller 1 and a light controller 2 (examples of the UEs 102a-102n) transmit the plurality of group message requests to the MSGin5G server 106 simultaneously or one at a time, which have been intended for a same home application server (an example of the application server 104). The plurality of group message requests includes the group messages indicating a status of lights, notification for changing settings, or the like. In an example herein, consider that the group message associated with each group message request may be of size lesser than the defined segment size and the low priority. In such a scenario, the MSGin5G server 106 aggregates the received plurality of group message requests into the single group message request in accordance with the scheduling policy. The MSGin5G server 106 transmits the single group message request to the home application server instead of transmitting the individual group message requests. Thereby, efficiently utilizing the control plane and user plane resources.

Figure 9A:
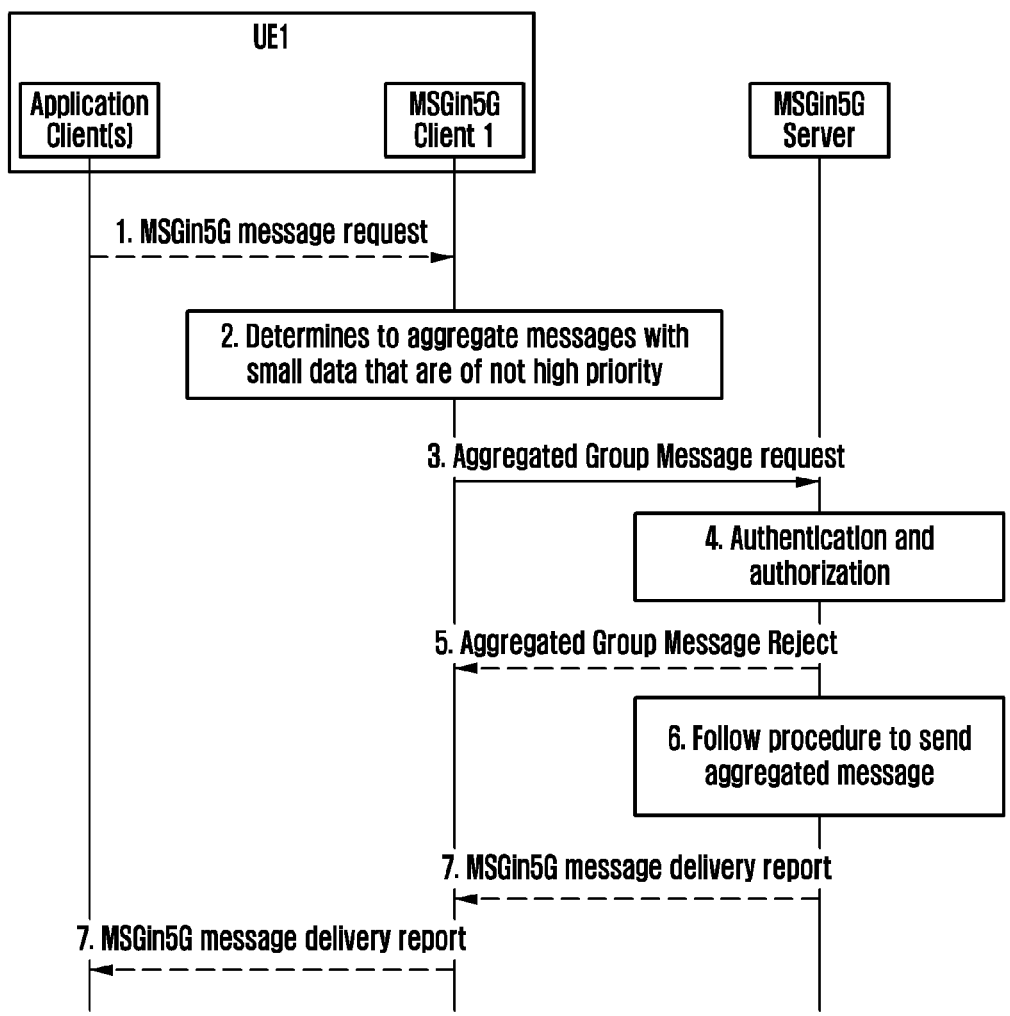
FIG. 9A is an example sequence diagram depicting aggregating point-to-point messages from the one or more application clients in the originator UE and transmitting the aggregated point-to-point messages from the originator UE to the target UE, according to embodiments as disclosed herein.

FIG. 9A is an example sequence diagram depicting aggregating the point-to-point messages from one or more application clients in the originator UE 102a and transmitting the aggregated point-to-point messages from the originator UE 102a to the target UE 102b, according to embodiments as disclosed herein.

At step 1, the application client 1 of the first UE/UE 1 (the originator UE 102a) initiates the first message request for transmitting the message to the target device. In an example herein, as depicted in FIG. 9A, the message request may be the point-to-point message request including the point-to-point message and the target device is the second UE/UE 2.

At step 2, the MSGin5G client 1 of the UE 1 determines if the first point-to-point message request can be aggregated. For determining if first point-to-point message request can be aggregated, the MSGin5G client 1 checks the size and/or the priority of the point-to-point message associated with the first point-to-point message request. The MSGin5G client 1 checks the size and/or the priority of the point-to-point message using the IEs of the first point-to-point message request. The IEs of the individual point-to-point message request is depicted in an example table of FIG. 9B. If the size of the point-to-point message is less than the threshold segment size and the priority of the message is the low priority or the medium priority, the MSGin5G client 1 determines that the corresponding first point-to-point message request can be aggregated. Further, the steps 1 and 2 can be performed multiple times in order to initiate the plurality of subsequent point-to-point message requests by the one or more application clients and determine if each of the plurality of group message requests can be aggregated by the MSGin5G client 1. The steps 1 and 2 can be performed multiple times, till the expiry of the timer or until the optimal use of segment size is reached. On the expiry of the timer or the optimal use of the segment size is reached, the MSGin5G client 1 aggregates the plurality of point-to-point message requests (including the first point-to-point message request and the subsequent point-to-point message requests) determined to aggregate in the single message request/single point-to-point message request. The IEs of the single point-to-point message request is depicted in an example table of FIG. 9C. The size/length of the single group message request is less than or equal to the threshold segment size, which has been allowed for the single point-to-point message request to transmit.

At step 3, the MSGin5G client 1 sends the single point-to-point message request to the MSGin5G server 106, which has been intended for the UE 2.

At step 4, the MSGin5G server 106 validates the MSGin5G client 1 of the UE 1 to check if the MSGin5G client 1 is authenticated and authorized to transmit the single point-to-point message request to the UE 2. If the MSGin5G client 1 is authenticated and authorized, the MSGin5G server 106 skips a step 5.

If the MSGin5G client 1 is not authenticated and authorized or the single point-to-point message request is not valid, the MSGin5G server 106 performs the step 5. At step 5, the MSGin5G server 106 transmits the message reject/aggregated message reject with the cause for the rejection to the MSGin5G client 1 of the UE 1. The IEs of the message reject are depicted in an example table of FIG. 9D.

If the MSGin5G client 1 is authenticated and authorized to send the single point-to-point message to the UE 2, at step 7, the MSGin5G server 106 sends the received point-to-point message from the MSGin5G client 1 to the UE 2 (as depicted in FIG. 10). Further, at step 7, the MSGin5G server 106 transmits the delivery report to the MSGin5G client 1, upon receiving the delivery report from the UE 2. At step 9, the MSGin5G client 1 transmits the received delivery report to the one or more application clients 1 of the UE 1 for further processing.

FIG. 10 is an example sequence diagram depicting delivery of the single aggregated point-to-point message request from the originator UE/UE 1 to the target UE/UE 2, according to embodiments as disclosed herein.

At step 1, the MSGin5G server 106 receives the single aggregated point-to-point message request including the aggregated plurality of point-to-point message requests (as depicted in the step 7 of FIG. 9A), which has been intended for the UE 2. At step 2, the MSGin5G server 106 sends the single point-to-point aggregated message request received from the UE 1 to the MSGin5G client 2 of the UE 2.

At step 3, the MSGin5G client 2 splits the received single point-to-point aggregated message request into the plurality of individual message requests per application and forwards the plurality of individual message requests to the application client(s) 2 of the UE 2. At step 4, the application client 2 of the UE 2 initiates sending the delivery report to the MSGin5G client 2, if requested by the MSGin5G server 106 in the single point-to-point message request received by the MSGin5G client 2 in the step 3. At step 5, the MSGin5G client 2 transmits the delivery report to the MSGin5G server 106.

Consider an example scenario, wherein an air controller (an example of the UE 1) transmits the plurality of point-to-point message requests to the MSGin5G server 106 simultaneously or one at a time, which have been intended for the UE 2 which is being used by a user present at a home. In an example herein, consider that the point-to-point message associated with each point-to-point message request is of size lesser than the threshold segment size and of the medium priority. In such a scenario, the MSGin5G client 1 aggregates the plurality of point-to-point message requests received from the air controller into the single point-to-point message request based on the scheduling policy and sends the single point-to-point message to MSGin5G server 106. The MSGin5G server 106 transmits the single point-to-point message request to the UE 2. The 5GSMS client 2 of the UE 2 splits the received single group message request into the multiple individual group message requests for further processing.

Figure 11A:
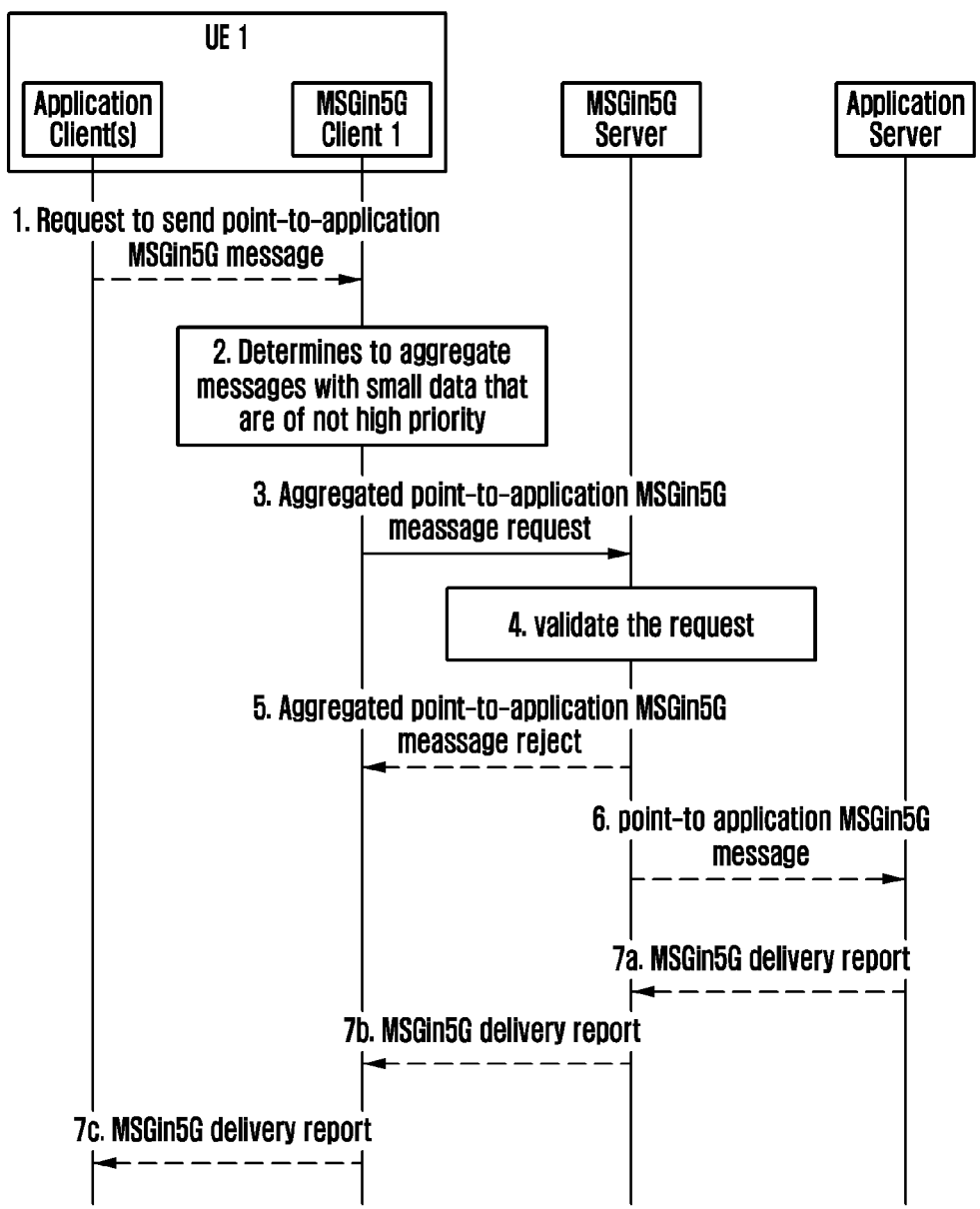
FIG. 11A is an example sequence diagram depicting aggregating point-to-application messages from the one or more application clients in the originating UE and transmitting the aggregated point-to-application messages from the originator UE to the application server, according to embodiments as disclosed herein.

FIG. 11A is an example sequence diagram depicting aggregating the point-to-application messages from one or more application clients in the originating UE 102a and transmitting the aggregated point-to-application messages from the originator UE 102a to the application server 104, according to embodiments as disclosed herein.

At step 1, the application client 1 of the first UE/UE 1 (the originator UE 102a) initiates the first message request for transmitting the message to the target device. In an example herein, as depicted in FIG. 11A, the first message request may be the first point-to-application message request including the point-to-application message and the target device is the application server 104.

At step 2, the MSGin5G client 1 of the UE 1 determines if the first point-to-application message request can be aggregated. For determining if the first point-to-application message request can be aggregated, the MSGin5G client 1 checks the size and/or the priority of the point-to-application message associated with the first point-to-application message request. The MSGin5G client 1 checks the size and/or the priority of the point-to-application message using the IEs of the first point-to-application message request. The IEs of the individual point-to-application message request is depicted in an example table of FIG. 11B. If the size of the point-to-application message is less than the threshold segment size and the priority of the point-to-application message is the low priority or the medium priority, the MSGin5G client 1 determines that the corresponding first point-to-application message request can be aggregated. Further, the steps 1 and 2 can be performed multiple times in order to initiate the plurality of subsequent point-to-application messages and determine if each of the plurality of subsequent point-to-application message requests can be aggregated. The steps 1 and 2 can be performed multiple times, till the expiry of the timer or until the optimal use of segment size is reached. On the expiry of the timer or until the optimal use of segment size is reached, the MSGin5G client 1 aggregates the plurality of point-to-application message requests (including the first point-to-application message request and the subsequent point-to-application message requests determined to aggregate) in the single message request/single point-to-application message request. The IEs of the single point-to-application message request is depicted in an example table of FIG. 11C. The size/length of the single point-to-application message request is less than or equal to the threshold segment size, which has been allowed for the single point-to-application message request to transmit.

At step 3, the MSGin5G client 1 sends the single point-to-application message request to the MSGin5G server 106, which has been intended for the application server 104.

At step 4, the MSGin5G server 106 validates the MSGin5G client 1 of the UE 1 to check if the MSGin5G client 1 is authenticated and authorized to transmit the single point-to-point message request to the UE 2. If the MSGin5G client 1 is authenticated and authorized, the MSGin5G server 106 skips a step 5.

If the MSGin5G client 1 is not authenticated and authorized or the single point-to-application message request is not valid, the MSGin5G server 106 performs the step 5. At step 5, the MSGin5G server 106 transmits the message reject/aggregated message reject with the cause for the rejection to the MSGin5G client 1 of the UE 1. The IEs of the message reject are depicted in an example table of FIG. 11D.

If the MSGin5G client 1 is authenticated and authorized to send the single point-to-point message to the application server 104, at step 6, the MSGin5G server 106 splits the received single point-to-application message request into the plurality of individual point-to-application message requests and transmits the plurality of individual point-to-application message requests to the application server 104.

At step 7A, the application server 104 initiates sending the delivery report to the MSGin5G server 106, if requested by the MSGin5G server 106 in the point-to-application message requests. At step 7B, the MSGin5G server 106 communicates the delivery report received from the application server 104 to the MSGin5G client 1 of the UE 1. At step 7C, the MSGin5G client 1 forwards the received delivery report to the one or more application clients 302 of the UE 1.

Consider an example scenario, wherein a speedometer deployed on a road (an example of the UE 1) initiates the plurality of point-to-application message requests simultaneously or one at a time, which have been intended for a traffic controller (an example of the application server 104). The plurality of point-to-application message requests includes the point-to-application messages indicating speed of vehicles. Each of the plurality of point-to-application messages associated with the aggregated plurality of point-to-application message requests may be of size less than the threshold segment size and the less priority. In such a scenario, the speedometer aggregates the initiated plurality of point-to-application message requests into the single point-to-application message request based on the scheduling policy. The speedometer transmits the single point-to-application message request to the MSGin5G server 106, which has been intended for the traffic controller. The MSGin5G server 106 splits the single point-to-application message request into the plurality of individual point-to-application message requests and forwards the plurality of individual point-to-application message requests to the traffic controller. The traffic controller may use the plurality of individual point-to-application message requests to rise a fine for users who have crossed an allowable speed limit.

Figure 12A:
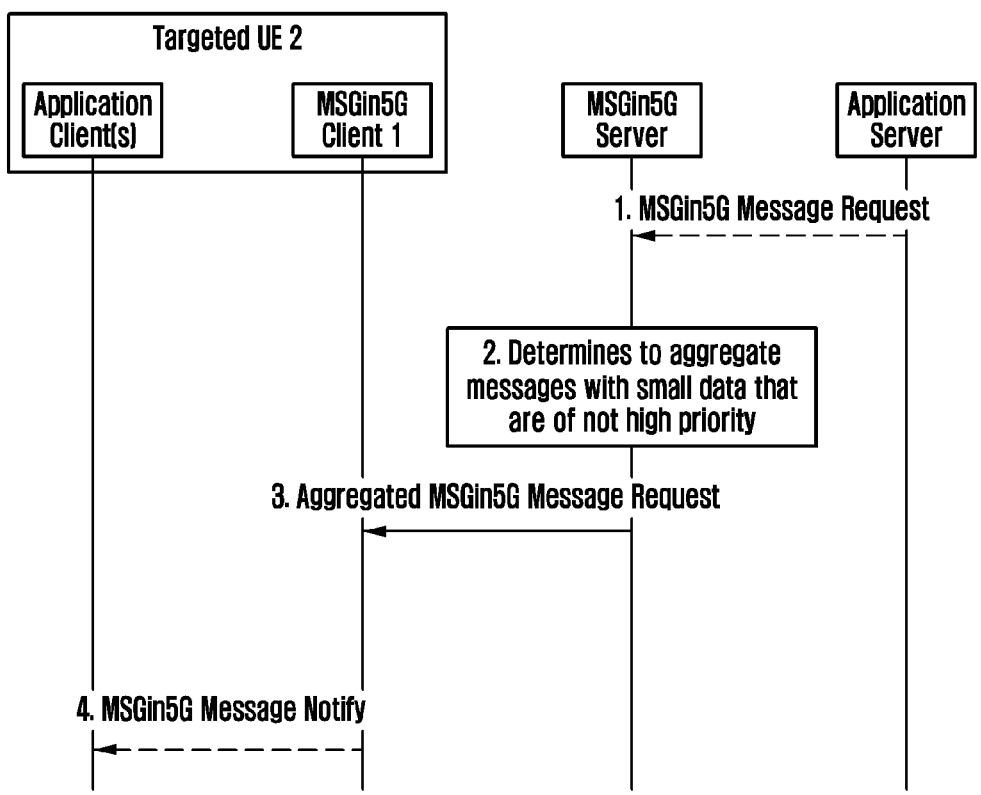
FIG. 12A is an example sequence diagram depicting aggregating application-to-point messages from the one or more application servers and transmitting the application-to-point messages from the message server towards the target UE, according to embodiments as disclosed herein.

FIG. 12A is an example sequence diagram depicting aggregating the application-to-point messages from one or more application servers and transmitting the application-to-point messages from the application server towards the target UE (102a-102n), according to embodiments as disclosed herein.

At step 1, the MSGin5G server 106 receives the first message request from the application server 104 to transmit the message for the target device. In an example herein, as depicted in FIG. 12A, the message request may be the application-to-point message request including the application-to-point message and the target device includes the UE (for example, the UE 102a/UE 1).

The example sequence diagram depicted in FIG. 12A may also be applicable for transmission of the group message from the first UE 102a/UE 1 to the target group or group of UEs. In such a scenario, in an example, the message request/first message request may be the point-to-point message request. The MSGin5G server 106 receives the first message request from the first UE 102a/UE 1 to transmit the message for the target device. In another example, the message request/first message request may be the group message request. The MSGin5G server 106 receives the first message request from the first UE 102a/UE 1 to transmit the message to target group or group of UEs.

At step 2, the MSGin5G server 106 determines if the first application-to-point message request can be aggregated. For determining if first application-to-point message request can be aggregated, the MSGin5G server 106 checks the size and/or the priority of the application-to-point message associated with the first application-to-point message request. The MSGin5G server 106 checks the size and/or the priority of the application-to-point message using the IEs of the application-to-point message. The IEs of the individual application-to-point message request is as depicted in an example table of FIG. 12B. If the size of the application-to-point message is less than the threshold segment size and the priority of the application-to-point message is the low priority or the medium priority, the MSGin5G server 106 determines that the corresponding first application-to-point message request can be aggregated. Further, the steps 1 and 2 can be performed multiple times in order to receive the plurality of subsequent application-to-point message requests from the application server 104 and determine if each of the plurality of subsequent group message requests can be aggregated. The steps 1 and 2 can be performed multiple times, till the expiry of the timer or until the optimal use of segment size is reached. On the expiry of the timer or the optimal use of segment size is reached, the MSGin5G server 106 aggregates the plurality of application-to-point message requests (including the first application-to-point message request and the subsequent application-to-point message requests determined to aggregate) in the single message request/single application-to-point message request. The IEs of the single application-to-point message request is depicted in an example table of FIG. 12C.

At step 3, the MSGin5G server 106 transmits the application-to-point message request to the MSGin5G client 1 of the UE 1. At step 4, the MSGin5G client 1 splits the received single application-to-point message request into the plurality of individual point-to-point message requests and transmits the plurality of individual point-to-point message requests to the application server 104.

Consider an example scenario, wherein a traffic controller (an example of the application server 104) transmits the application-to-point message requests to the MSGin5G server 106 simultaneously or one at a time, which have been intended for a camera (an example of the UE 2) deployed for monitoring a traffic on a road. The application-to-point message requests may include the application-to-point messages indicating positions/configurations for the camera, notifications for the camera to monitor a subject who violates traffic rules, and so on. In an example herein, consider that the application-to-point message associated with each application-to-point message request is of size lesser than the threshold segment size and of the medium priority. In such a scenario, the MSGin5G server 106 aggregates the application-to-point message requests received from traffic controller into the single application-to-point message request based on the scheduling policy. The MSGin5G server 106 transmits the single application-to-point message request to the camera. The 5GSMS client 2 of the camera splits the received single group message request into the multiple individual group message requests for further processing.

Figure 13A:
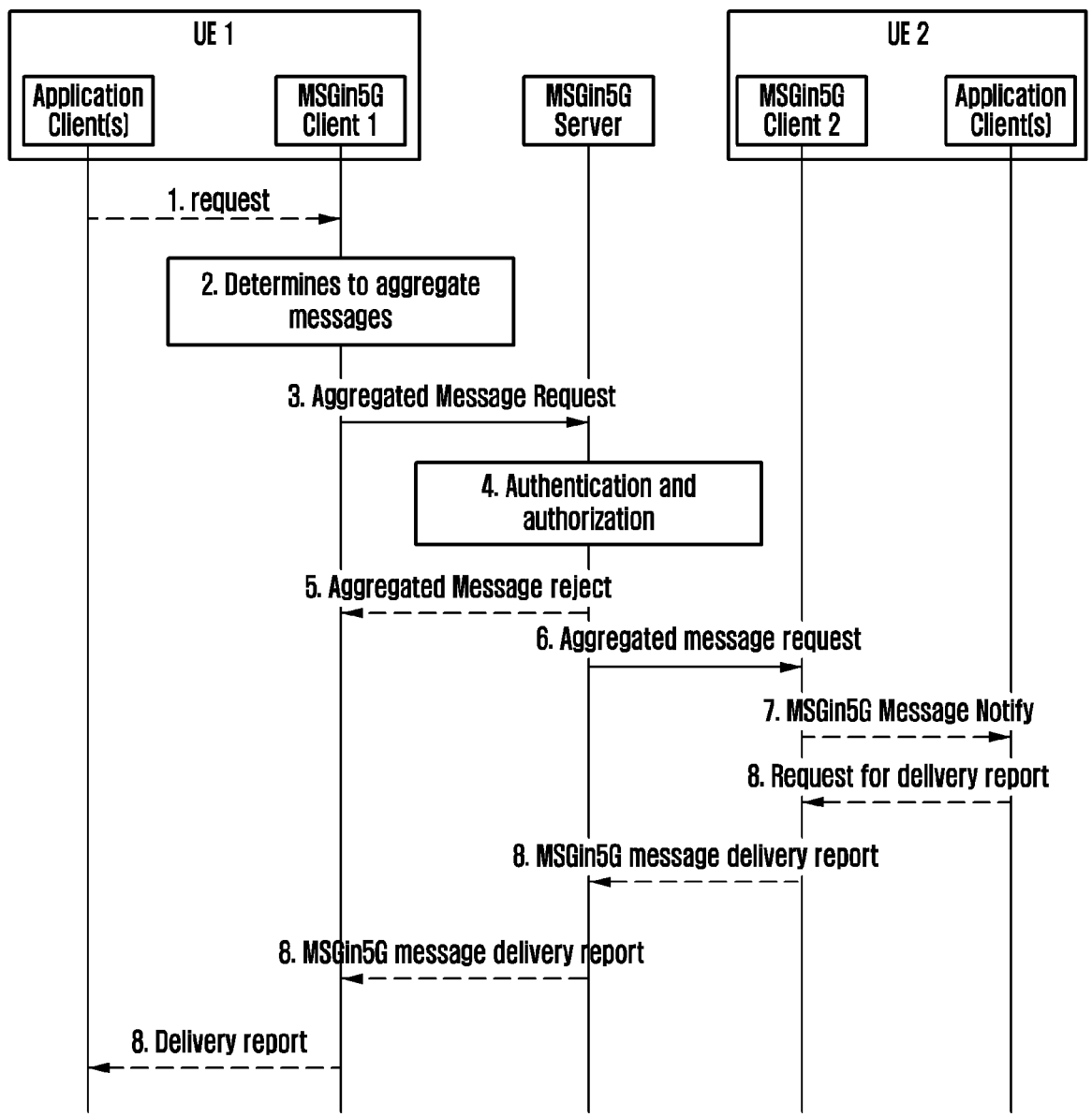
FIG. 13A is an example sequence diagram depicting an end-to-end procedure for aggregating the point-to-point messages from the one or more application clients in the originator UE and transmitting the aggregated point-to-point messages from the originator UE to the target UE, according to embodiments as disclosed herein.

FIG. 13A is an example sequence diagram depicting end to end procedure for aggregating point-to-point messages from one or more application clients in the originator UE 102*a* and transmitting transmission of the aggregated point-to-point messages from the originator UE 102*a* to the target UE 102*b*, according to embodiments as disclosed herein.

As depicted in FIG. 13A, the MSGin5G client 1 of the UE 1 (the originator UE 102*a*) aggregates the plurality of point-to-point messages into the single message request and transmits the single message request to the MSGin5G server 106. The single message request may be intended for the target UE/UE 2. Aggregating the plurality of point-to-point messages into the single message request and transmitting the single message request to the MSGin5G server 106 is depicted in steps 1-3, which correspond to steps 1-3 of FIG. 9A, thus a repeated detailed description thereof is omitted for conciseness. Further, the IEs of the individual point-to-point message request initiated at the UE 1 are depicted in an example table of FIG. 13B. The IEs of the single point-to-point message request aggregated at the UE 1 for the target UE 2 are depicted in an example table of FIG. 13C.

On receiving the single message request from the UE 1, the MSGin5G server 106 checks if the UE 1 is authenticated and authorized to transmit the single message request, as depicted in step 4. If the UE 1 is not authenticated and authorized to transmit the single message request, the MSGin5G server 106 sends the message reject/aggregated message reject with the cause for the rejection to the MSGin5G client 1 of the UE 1, as depicted in step 5. The steps 4 and 5 correspond to steps 4 and 5 of FIG. 9A, thus a repeated detailed description thereof is omitted for conciseness. Further, the IEs of the reject message received by the UE 1 in response to the transmitted single point-to-point message request is depicted in FIG. 13D.

If the UE 1 is authenticated and authorized to transmit the single message request, the MSGin5G server 106 transmits the single message request to the UE 2. Transmission of the single message request from the MSGin5G server 106 to the UE 2 is depicted in steps 6-8, which correspond to steps 1-5 of FIG. 10, thus a repeated detailed description thereof is omitted for conciseness.

In an embodiment, the example sequence diagram depicted in FIG. 13A may also be applicable for the point-to-application message from an application client(s) in the first UE 102*a*/UE 1 to transmit a message for the application server 104.

Embodiments herein provide methods and systems for enabling:

IoT devices/MIoT devices to aggregate multiple messages into a single IoT message and forward the single IoT message to a group of UEs or application servers;

a message server to aggregate the multiple messages from the different IoT/MIoT devices of a same group into the single IoT message and forward the single IoT message towards members of the group; and a message server to aggregate the multiple messages targeted towards a same recipient IoT device to encode the multiple small IoT messages into the single IoT message containing the multiple messages.

Embodiments herein aggregate the multiple messages with the small data into the single message, based on a maximum segment size allowed to transmit over available transport towards the target device.

Embodiments herein enable:

a MSGin5G client to aggregate group messages towards a target group;

a MSGin5G server to aggregate group messages towards a target UE;

the MSGin5G server to aggregate group messages towards a target group;

the MSGin5G client to aggregates messages towards another target in point-to-point messaging;

the MSGin5G server to deliver the aggregated message request towards the target UE;

the MSGin5G client aggregate messages towards an application in point-to-application messaging; and the MSGin5G server to aggregate application-to-point messages towards the target UE.

Embodiments herein exchange message in an IoT communication system by utilizing network resources to its full capacity.

In an embodiment, the IoT devices do not require to send the message every time on sensing an event, thereby saving power and the IoT devices do not require to wake up each time for reception of a single message.

In an embodiment, the message server may aggregate the multiple messages towards the target device and sends only when a required number of messages are available, thereby saving communication power and network bandwidth.

The embodiments disclosed herein can be implemented through at least one software program running on at least one hardware device and performing network management functions to control the elements. The elements shown in FIGS. 1, 2, 3, and 4 can be at least one of a hardware device, or a combination of hardware device and software module.

The embodiments disclosed herein describe methods and systems for exchanging messages in an IoT communication system. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g., Very high speed integrated circuit hardware description language (VHDL) another programming language, or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the present disclosure may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) including a first entity and a second entity for exchanging messages in an Internet of Things (IoT) communication system, the method comprising:
    receiving, from the first entity, message requests to the second entity to send messages to a server, wherein the first entity is an application client and the second entity is a messaging fifth generation (MSGin5G) client;
    checking a size of each of the messages associated with the message requests and a priority level of each of the messages associated with the message requests;
    determining whether to aggregate the message requests, when the size of each of the messages associated with the message requests is less than a threshold segment size and the priority level of each of the messages associated with the message requests is not high priority;
    aggregating the message requests; and
    sending the aggregated message requests to the server in the IoT communication system,
    wherein the aggregated message requests include an originator fifth generation messaging services (5GMSGS) client identifier (ID), a destination 5GMSGS client ID, a message ID for the aggregated message requests, a number of individual messages for indicating a total number of messages that are aggregated into a single message, and a list of the individual messages each of which includes an element of information contained in the message requests.

2. The method of claim 1, further comprising:
    receiving, from the server, an aggregated message reject in case that the UE is not authorized to send the aggregated message requests to target UE or the aggregated message requests are not valid.

3. The method of claim 2, wherein the aggregated message reject includes at least one of a destination 5GMSGS Client ID, a message ID, or a reject reason.

4. The method of claim 1, wherein each of the messages includes at least one of an individual message ID, an application ID, a disposition Type, a payload, or a priority type.

5. A method performed by a server for exchanging messages in an Internet of Things (IoT) communication system, the method comprising:
    receiving, from a user equipment (UE), aggregated message requests; and
    checking whether the UE is authenticated and authorized to send the aggregated message requests,
    wherein whether to aggregate message requests is determined, when a size of each of the messages associated with the message requests is less than a threshold segment size and a priority level of each of the messages associated with the message requests is not high priority,
    wherein a first entity is an application client and a second entity is a messaging fifth generation (MSGin5G) client included in the UE,
    wherein the message requests are transmitted from the first entity to the second entity to send the aggregated message requests to the server, and
    wherein the aggregated message requests include an originator fifth generation messaging services (5GMSGS) client identifier (ID), a destination 5GMSGS client ID, a message ID for the aggregated message requests, a number of individual messages for indicating a total number of messages that are aggregated into a single message, and a list of the individual messages each of which includes an element of information contained in the aggregated message requests.

6. The method of claim 5, further comprising:
    transmitting, to the UE, an aggregated message reject in case that the UE is not authorized to send the aggregated message requests to target UE or the aggregated message requests are not valid.

7. The method of claim 6, wherein the aggregated message reject includes at least one of a destination 5GMSGS Client ID, a message ID, or a reject reason.

8. The method of claim 5, wherein each of the messages includes at least one of an individual Message ID, an application ID, a disposition Type, a payload, or a priority type.

9. A user equipment (UE) for exchanging messages in an Internet of Things (IoT) communication system, the UE comprising:
    a transceiver; and
    a controller coupled the transceiver and configured to:
        receive, from a first entity, message requests to a second entity to send messages to a server,
        check a size of each of the messages associated with the message requests and a priority level of each of the messages associated with the message requests,
        determine whether to aggregate the message requests, when the size of each of the messages associated with the message requests is less than a threshold segment size and the priority level of each of the messages associated with the message requests is not high priority,
        aggregate the message requests, and
        send the aggregated message requests to the server in the IoT communication system,
    wherein the first entity is an application client and the second entity is a messaging fifth generation (MSGin5G) client included in the UE, and
    wherein the aggregated message requests include an originator fifth generation messaging services (5GMSGS) client identifier (ID), a destination 5GMSGS client ID, a message ID for the aggregated message requests, a number of individual messages for indicating a total number of messages that are aggregated into a single message, and a list of the individual messages each of which includes an element of information contained in the aggregated message requests.

10. The UE of claim 9, wherein the controller is further configured to receive, from the server, an aggregated message reject in case that the UE is not authorized to send the aggregated message requests to target UE or the aggregated message requests are not valid.

11. The UE of claim 10, wherein the aggregated message reject includes at least one of a destination 5GMSGS Client ID, a message ID, or a reject reason.

12. The UE of claim 9, wherein each of the messages includes at least one of an individual message ID, an application ID, a disposition Type, a payload, or a priority type.

13. A server for exchanging messages in an Internet of Things (IoT) communication system, the server comprising:
- a transceiver; and
- a controller coupled the transceiver and configured to:
  - receive, from a user equipment (UE), aggregated message requests, and
  - check whether the UE is authenticated and authorized to send the aggregated message requests,
- wherein whether to aggregate message requests is determined, when a size of each of the messages associated with the message requests is less than a threshold segment size and a priority level of each of the messages associated with the message requests is not high priority, wherein a first entity is an application client and a second entity is a messaging fifth generation (MSGin5G) client included in the UE,
- wherein the message requests are transmitted from the first entity to the second entity to send the aggregated message requests to the server, and
- wherein the aggregated message requests include an originator fifth generation messaging services (5GMSGS) client identifier (ID), a destination 5GMSGS client ID, a message ID for the aggregated message requests, a number of individual messages for indicating a total number of messages that are aggregated into a single message, and a list of the individual messages each of which includes an element of information contained in the message requests.

14. The server of claim 13, wherein the controller is further configured to transmit, to the UE, an aggregated message reject in case that the UE is not authorized to send the aggregated message requests to target UE or the aggregated message requests are not valid.

15. The server of claim 14, wherein the aggregated message reject includes at least one of a destination 5GMSGS Client ID, a message ID, or a reject reason.

16. The server of claim 13, wherein each of the messages includes at least one of an individual message ID, an application ID, a disposition Type, a payload, or a priority type.

* * * * *